(12) United States Patent
Kukal et al.

(10) Patent No.: US 8,286,110 B1
(45) Date of Patent: Oct. 9, 2012

(54) SYSTEM AND METHOD FOR ADAPTING ELECTRICAL INTEGRITY ANALYSIS TO PARAMETRICALLY INTEGRATED ENVIRONMENT

(75) Inventors: Taranjit Singh Kukal, Delhi (IN); Feras Al-Hawari, Chelmsford, MA (US); Dennis Nagle, Peabody, MA (US); Raymond Komow, Chelmsford, MA (US); Jilin Tan, Nashua, NH (US)

(73) Assignee: Cadence Design Systems, Inc., San Jose, CA (US)

( * ) Notice: Subject to any disclaimer, the term of this patent is extended or adjusted under 35 U.S.C. 154(b) by 30 days.

(21) Appl. No.: 12/979,080

(22) Filed: Dec. 27, 2010

(51) Int. Cl.
*G06F 9/455* (2006.01)
*G06F 17/50* (2006.01)

(52) U.S. Cl. ............ 716/109; 716/51; 716/52; 716/106; 716/115; 716/136

(58) Field of Classification Search ............... 716/51, 716/52, 106, 115, 132, 133, 136, 109
See application file for complete search history.

(56) References Cited

U.S. PATENT DOCUMENTS

2002/0188915 A1* 12/2002 Hayes .................. 716/4

* cited by examiner

*Primary Examiner* — Thuan Do
*Assistant Examiner* — Brian Ngo
(74) *Attorney, Agent, or Firm* — Rosenberg, Klein & Lee

(57) ABSTRACT

A system and method is provided for generating a programmably implemented model which emulates a power delivery network serving an integrated circuit (IC) core in an electronic system. The system and method generally comprise measures for establishing a power integrity (PI) topology including models for a voltage regulator module that generates at least one predetermined supply voltage level, and for a conductive power rail portion of the power delivery network (PDN). The system and method further comprise measures for interconnecting to the conductive power rail portion model a first behavioral model indicative of the current consumption characteristics of the IC core, and a second behavioral model indicative of the current consumption of an IO interface buffer driving an output signal of the electronic system.

24 Claims, 33 Drawing Sheets

US 8,286,110 B1

SYSTEM AND METHOD FOR ADAPTING ELECTRICAL INTEGRITY ANALYSIS TO PARAMETRICALLY INTEGRATED ENVIRONMENT

BACKGROUND OF THE INVENTION

The subject system and method are generally directed to analyzing the electrical integrity of an electronic system to be implemented. The system and method enable accurate and efficient measures for carrying out various analyses, such as for power and signal integrity, at a chip, package, or board level. The system and method provide measures for adapting such integrity analyses to an integrated environment which reflects non-ideal, real world operating conditions, where the intercoupling of various electrical parameters are suitably accounted for.

The overall verification for an electronic system to be implemented typically includes signal integrity (SI) and/or power integrity (PI) analysis of the electronic system design, upon simulated operation using a suitable simulation tool. Actual operation of the electronic system upon physical implementation would necessarily occur in a non-ideal real-world environment, where parametric intercoupling between different system portions would also occur. Yet, integrity analysis tools heretofore known do not provide adequate measures for analyzing the electronic system's operation in a sufficiently integrated simulation environment, where such parametric intercoupling is comparably modeled. Consequently, electrically intercoupled effects such as between power delivery networks (PDN) and signal-delivering interconnects of a prospective chip, package, or board implementation are not taken suitably into account.

With the ongoing trend of implementing electronic systems (be they on the chip, package, or board levels) increasingly smaller and faster, it is increasingly important to employ highly accurate and efficient simulation techniques to characterize performance baselines of printed circuit board (PCB), or other electronic system designs prior to actual fabrication of prototype boards or designs. Signal integrity (SI) analysis, power integrity (PI) analysis, and characterization of simultaneous switching noise (SSN) are ways of establishing the baseline performance of electronic boards or designs before expending valuable resources in prototyping an electronic board or design.

SUMMARY OF THE INVENTION

It is an object of the present invention to provide a system and method for adapting various electrical integrity analyses to an integrated environment which reflects non-ideal, real world operating conditions, where the intercoupling of various electrical parameters are suitably accounted for.

These and other objects are attained in a system and method for generating a programmably implemented model for emulating signal processing operation of an integrated circuit (IC) core in an electronic system. The system and method generally comprise measures for establishing a power integrity (PI) topology including behavioral models to emulate a power delivery network (PDN) serving the IC core. The PI topology maintains at least one supply reference voltage in variable manner responsive to parametric coupling of the PDN with the IC core and an IO interface buffer of the electronic system during operation thereof. The method and system further comprise measures for establishing a signal integrity (SI) topology including behavioral models to emulate analog input, output, and transmission characteristics of the IC core, and for interconnecting the SI topology to the PI topology to form a composite SI/PI topology, the SI topology being thereby powered responsive to said variable supply reference voltage of the PI topology.

A system and method implemented in accordance with certain embodiments of the present invention provide for unified signal integrity (SI) and power integrity (PI) analysis of an integrated circuit (IC) core powered operate in an electronic system by a power delivery network (PDN). The system generally comprises a controller unit generating a programmably implemented composite model for emulating signal processing operation of the IC core. This composite model includes a PI topology having behavioral models interconnected to emulate the PDN serving the IC core, wherein the PI topology maintains at least one supply reference voltage in variable manner responsive to parametric coupling of the PDN with the IC core and an IO interface buffer of the electronic system during operation thereof. The composite model also includes an SI topology interconnected to the PI topology, and has behavioral models interconnected to emulate analog input, output, and transmission characteristics of the IC core to be thereby powered responsive to the variable supply reference voltage of the PI topology. The system further comprises a simulator unit coupled to the controller unit, which executes AC and transient simulation for the composite model to generate SI integrity analysis data for IC core operation.

DESCRIPTION OF THE PREFERRED EMBODIMENTS

Figure 1:
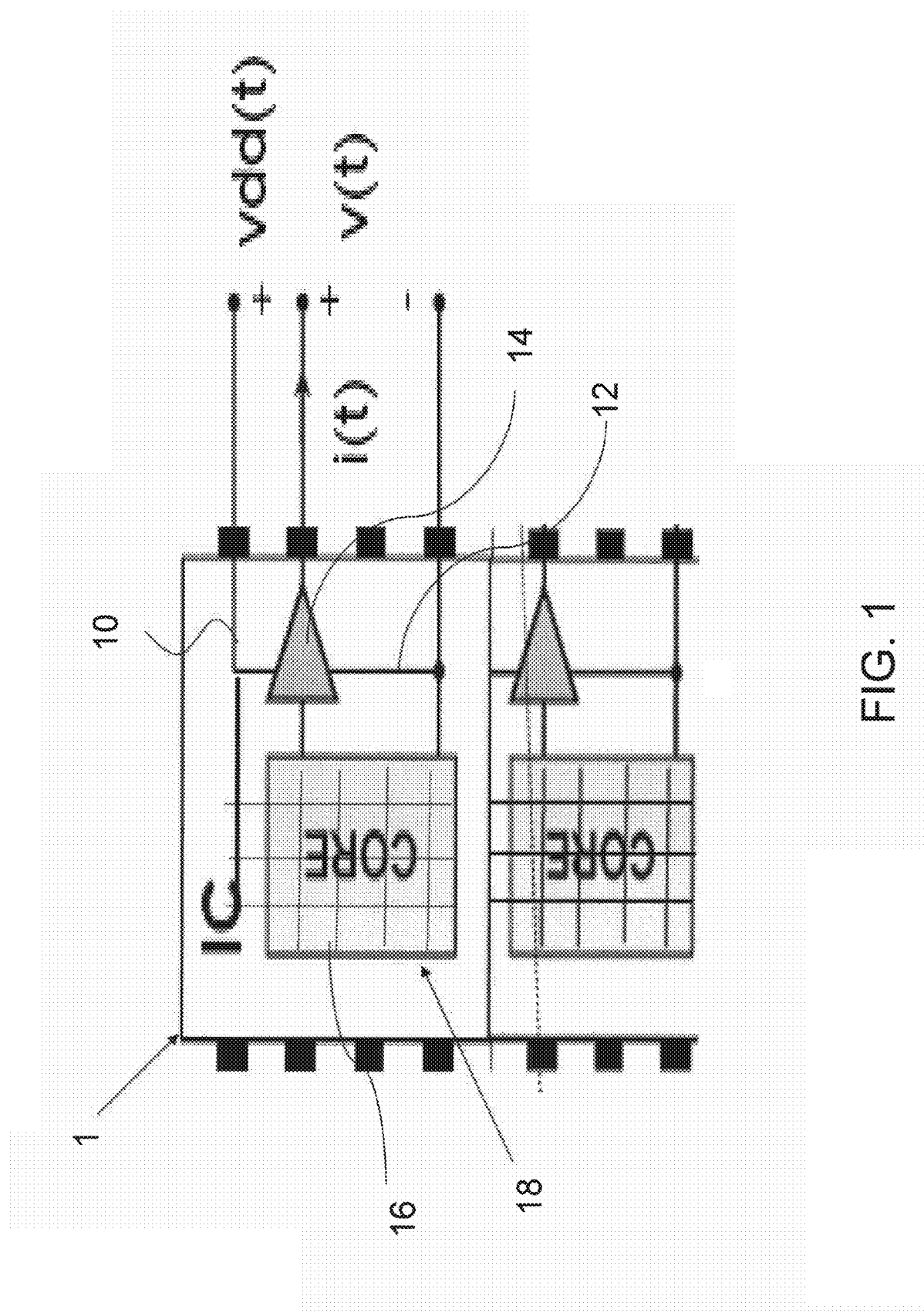
FIG. 1 is a schematic diagram illustrating examples of different power delivery networks and power/signal traces typically employed in electronic system design.

The subject system and method generally provide measures for efficiently yet accurately analyzing power and signal integrity in a package or board level electronic system design. Portions of an electronic system design are modeled in typical applications with one or more integrated circuit (IC) cores which implement certain logic to generate an IO signal that is then passed outside the electronic system (or electronic subsystem)—be it to a component outside an IC package or to other onboard portions of a shared circuit board—via an Input/Output (TO) buffer. Each IC core and IO buffer is supplied with reference power levels (i.e., Vdd, Vss, Gnd) through an in-package or on-board power delivery network (PDN) extending from one or more regulated power sources. Often, space/dimensional limitations require the PDN supplying the IC core (IC PDN) and the PDN supplying the IO buffer (IO PDN) to be parts of a shared conductive network. The IC PDN, IO PDN, and the IO signal generated by the IC core are respectively carried on appropriately routed conductive traces in a physical implementation of the electrical circuit design. Given the ongoing demand for dense, high scale integration of electrical circuit designs, these traces tend to be laid out in increasingly closer proximity to one another.

Ideally, the power references would hold at a predetermined fixed voltage level during operation, without fluctuation. Under the non-ideal conditions invariably encountered during actual operation of an electronic system, however, considerable fluctuations occur in both the non-zero power and ground references supplied through respective PDN's. There are several notable causes of such fluctuations. First, the supply voltage level may drop during circuit operation due to excessive current draw by the IC core, which yields a loading effect on the IC PDN. Second, the supply voltage may also drop due to excessive current draw by the IO buffer during circuit operation, which similarly yields a loading effect on the IO PDN. The problem is only exacerbated by circuit operation at the very high switching frequencies required in many applications, where current draw during circuit operation tends to be all the heavier, causing considerable voltage dips due to static IR-drop or dynamic IR-drop (resonance conditions).

Where the IC PDN and IO PDN share conductive portions, the loading effects which plague one necessarily plague the other. Even where the IC PDN and IO PDN are formed as separate dedicated networks, they are often disposed in close enough physical proximity to induce noisy disturbances in one another during circuit operation.

A third notable cause of supply voltage level fluctuation is the coupling between the supply voltage and the IO signal (at the IO buffer output). Where the conductive traces carrying the supply voltage and IO signal are physically disposed closely enough in physical proximity (as determined by switching frequency, signal and reference levels, trace geometries, and other such factors), undesirable signal coupling occurs, for example, in the form of cross talk and the like. This results in noisy mutual disturbance between the supply voltage and IO signal. In particular, high speed switching in the IO signal trace tends to induce considerable noise in the IO PDN, which in turn couples with the IC PDN to spread the disturbing effects.

Due to these factors, a supply voltage Vdd of 5V, for instance, may encounter a drop to a level of, say, 4.7V. The IO signal V(t) of the IC core would then degrade in switching amplitude—to switch between 0V and 4.7V, rather than between the intended range of 0V and 5V. This may lead to further degradation, and eventual failure, of certain signals.

Power integrity (PI) and signal integrity (SI) analyses are typically carried out on a given electrical circuit design at the package or board levels. PI analysis is generally conducted in the context of an IC core current consumption model, which affects the IC PDN. SI analysis is generally conducted in the context of an IC core and IO buffer model, which touches on both the IC PDN and IO PDN. The fluctuation of supply reference levels seen on the IC PDN and IO PDN would, therefore, affect the SI analysis. Yet, SI analysis is typically carried out in the art in substantial isolation from PI analysis, without due regard for the intercoupling of the voltage degradation seen during operation at the IC PDN, IO PDN, and IO buffer interconnects.

In accordance with certain aspects of the present invention, the subject system and method provide for the efficient yet accurate analyses of power and signal integrity. The system and method take effectively into account the mutually-dependent interplay between the degrading effects suffered by the supply references and IO signal carried on the IC PDN, the IO PDN, and the IO signal traces under realistic, non-ideal operating conditions. According to different aspects of the present invention, the system and method provide the following 'building blocks' which contribute to the overall efficacy of PI and SI analyses:

1. Exploratory generation of PI topology which models the given PDN in the context of the IC core and IO buffer fed thereby for accurate PI analysis, the exploratory generation enabling quick and efficient what-if modifications to the PDN for optimizing PI;
2. Unified PI and SI analysis in an integrated environment to enable true to life simulation for accurate SI analysis; and,
3. Adaptive reconfiguration of known buffer models compatible with true to life simulation for accurate SI analysis based on non-ideal supply references.

These 'building blocks' may be employed separately as needed, or in combination, to enhance the efficiency and/or accuracy of the resulting PI and SI analyses. Preferably, they are employed in combination for optimum enhancement in this regard. The 'building blocks' are described in turn following a description of generally applicable features below.

Generally Applicable Features

Signals within a system may generally be modeled as a voltage waveform transmitted from some driver component to some receiver component. In a digital application, the signal is normally defined by a stream of binary voltage values passed between the driver and receiver, each of which may be represented in simulated environments by a corresponding buffer model. An IO buffer amplifies the signal from an onboard IC core to drive a board signal outside of the IC. Signal integrity (SI) analysis is carried out to verify the fidelity of such signals passing from a driver IO buffer to a receiver IO buffer through a transmission line interconnect. SI analysis thereby characterizes the quality of transmitted signals through physical interconnects like traces, connectors, vias, etc.

Vias are structures employed in PCB designs to accommodate routing complexities, high speed, and high densities. They interconnect traces residing at different layers of a multilayered PCT. An IO PDN is a power delivery network that feeds to the IO buffers of an IC sufficient supply power for proper operation. A core PDN is a power delivery network that feeds the core of an IC. A PDN generally starts from a suitable voltage regulator that generates a DC voltage reference, and includes conductive traces which lead from the voltage regulator to branch out to various points of one or more receiver circuits, the power and/or ground plane employed, and the decoupling capacitors that may be coupled at various points along the conductive traces to sink noise components to ground. The conductive traces of a PDN are collectively referred to herein as the power rail thereof.

Power integrity (PI) analysis generally verifies the stability of the supply input voltage as it supplies an IC core through its operation. Under ideal conditions, the supply voltage would maintain a constant DC level, but under the non-ideal conditions invariably encountered in actual use, the supply voltage tends to fluctuate due to such factors as high switching speeds in the IC core resulting from varying current demands therein. PI analyses typically observe the IC PDN feeding the IC core for voltage dips or fluctuations.

As mentioned, the high frequency of the IC signal transitions and the dense packaging employed in PCB designs permits switching noise from signals to couple with the voltage on the power traces, causing dips in the voltage. The current drawn by IO buffers due to the high switching frequencies tends to similarly load the IO PDN which causes voltage fluctuations.

A PDN is a conductive network that feeds power from a voltage source on a PCB through a package power rail to the IC power pin inside the IC chip. A PDN typically includes a voltage regulator, copper trace, power/ground planes, and decoupling capacitors situated at predetermined points. The voltage regulator is connected to the copper trace with respect to system ground and delivers the supply reference voltage(s) to the board/package/chip, including the IC core and/or IO buffer. Each decoupling capacitor employed in the PDN helps to dampen the noise on a power trace by sinking the noise to ground.

Typically, the IC core PDN and the IO PDN have been analyzed heretofore independently, in connection with respective PI and SI analyses. Such independent analyses for the IC core PDN and IO PDN preclude consideration of the coupling effects that tend to arise between the signal traces and the IO PDN, and also between the IC core PDN and the IO PDN.

FIG. 1 depicts a schematic diagram illustrating examples of an IO PDN and an IC core PDN employed in a typical electronic system design (IC chip 1). The diagram schematically depicts software models for an IC chip 1 with employing a plurality of IC core portions. With reference to one of the IC core portions shown, for example, IC core 18 includes internal circuitry 16 indicated by the mesh lines. The circuitry 16 within the IC core 18 draws power from the package model supplying power voltage Vdd(t) (symbolically represented in terms of variable "t" to indicate its unintended fluctuation as a function of time). An IO buffer 14 amplifies the output signal of the IC core 16 before it is output from the IC chip 1. The IC core PDN, or IC PDN 10, is the power delivery network that delivers the supply reference voltage(s) necessary to carry out the IC core logic. IO PDN 12 is the power delivery network that delivers the supply reference voltage(s) to the IO buffer 14. The supplied package power Vdd is typically derived from a voltage regulator module (VRM) that outputs the needed voltage to the IC core 18, IC PDN 10, and IO PDN 12.

A drop in the expected supply reference voltage of an IC chip 1 introduces disturbances like ripple, crosstalk, ground bounce, and PDN noise, all of which conspire to reduce the fidelity of signals generated during circuit operation. An unexpected voltage drop may cause signal delays coming from the IO buffer and also impact the maximum frequency at which the IC chip 1 may operate. Such voltage drops typically occur due to current being drawn by the IC core 18 or by IO buffers 14 when switching on signal traces occurs at high frequencies. As noted, noise may also be introduced in high density designs as a result of parametric coupling (1) between the power rails and signal traces, and (2) traces carrying high switching signals and the IO PDN (switching induced noise) which may in turn couple with the IC core PDN.

Figure 2:
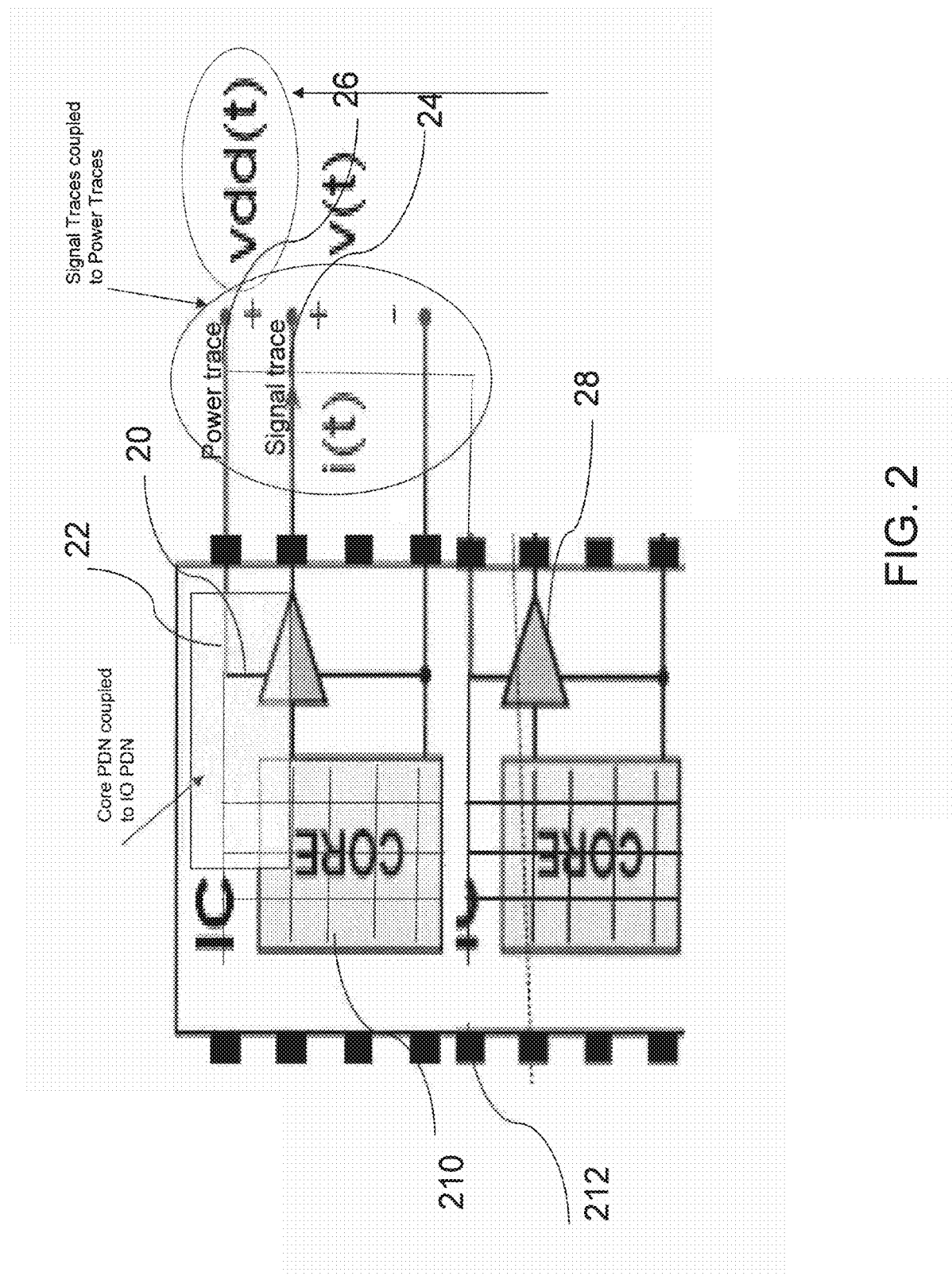
FIG. 2 is the schematic diagram of the power delivery networks and traces of FIG. 1, illustrating the coupling between portions thereof.

FIG. 2 schematically indicates the coupling that may occur between the IO PDN 20, IC core PDN 22, power traces 26, and signal traces 24. Coupling between the signal traces 24 and power traces 26 may occur due to the proximity of the traces permitting mutual noise effects leading to reference voltage/signal degradation. High frequency circuits—those incorporating gigahertz design, for example—typically require traces of signal tracks (power rail and signal lines) to be in close proximity to one another (on the order of mils). Degradation may also occur due to the current being drawn by IO buffers 28 switching at high frequencies which causes dynamic loads on the IO PDN 20 resulting in voltage fluctuations, and due to the IC core PDN 22 coupling with the IO PDN 20 especially where they share a power delivery network for minimizing design footprint. Even where different power delivery networks are employed, sufficient coupling may occur through a shared ground plane. Moreover, the IO PDN 20 and IC core PDN 22 may be in close enough proximity in the IC chip 212 for unwanted noise coupling therebetween.

Due to the intercoupling effects noted herein, the IC core PDN 22 and IO PDN 20 cannot be accurately analyzed independent of the other. For optimal design, signal integrity and power integrity require analysis in mutual context—that is, in an integrated environment where such unavoidable interactions between the IO PDN 20, core PDN 22, and SI interconnects 24 are taken properly into account.

Figure 3:
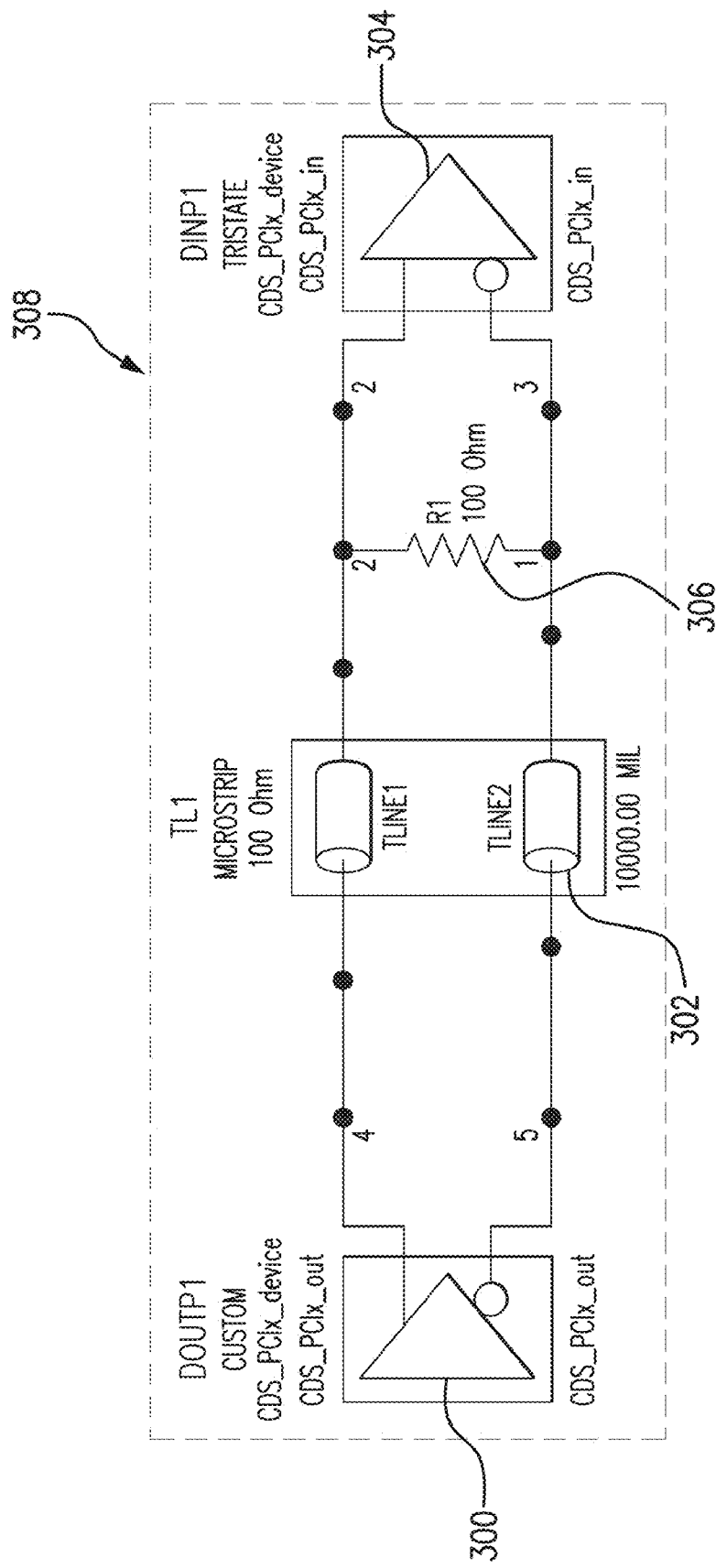
FIG. 3 is a schematic diagram illustrating an example of a signal integrity (SI) topology for an electronic system design.

FIG. 3 illustrates an SI topology 308 when taken alone. Such topologies illustrated in this and other FIGS. herein are preferably also displayable for a user by a suitable graphic user interface during system operation. Topology 308 includes models for a driver IO buffer 300, receiver IO buffer 304, signal interconnect 302, and termination 306. A signal originates from the driver IO buffer 300 and propagates through the signal interconnects 302 on to the receiver IO buffer 304. Ideally, the signal output of the driver IO buffer 300 would be clean and free of noise. Signal integrity analysis characterizes the level of noise in the signal. The depicted interconnect 302 is a model representing a conductive trace for the signal. A termination 306 is needed to minimize signal reflection at the receiver IO buffer 304.

The IO buffers 300, 304 (driver and receiver) are characterized at a level of abstraction above the multitudes of transistor devices in the make up of the individual buffers. IO buffers widely used in the art are modeled according to the I/O Buffer Information Specification (IBIS) standard for defining the analog characteristics of integrated circuits' input and output. Notably, using such IBIS IO buffer models to represent the transistor devices typically yields considerable savings in the required analysis time. IBIS buffers are characterized at fixed supply reference voltages at their transistor levels. Thus, when a standard IBIS buffer model is included in the signal integrity analysis, the supply reference voltage and ground are normally assumed to be fixed at their ideal levels. In other words, the power is assumed to be ideal. The conventional approach to signal integrity analysis does not account for the voltage drop due to signal coupling, resonance, and loading effects encountered under actual operating conditions.

Figure 4:
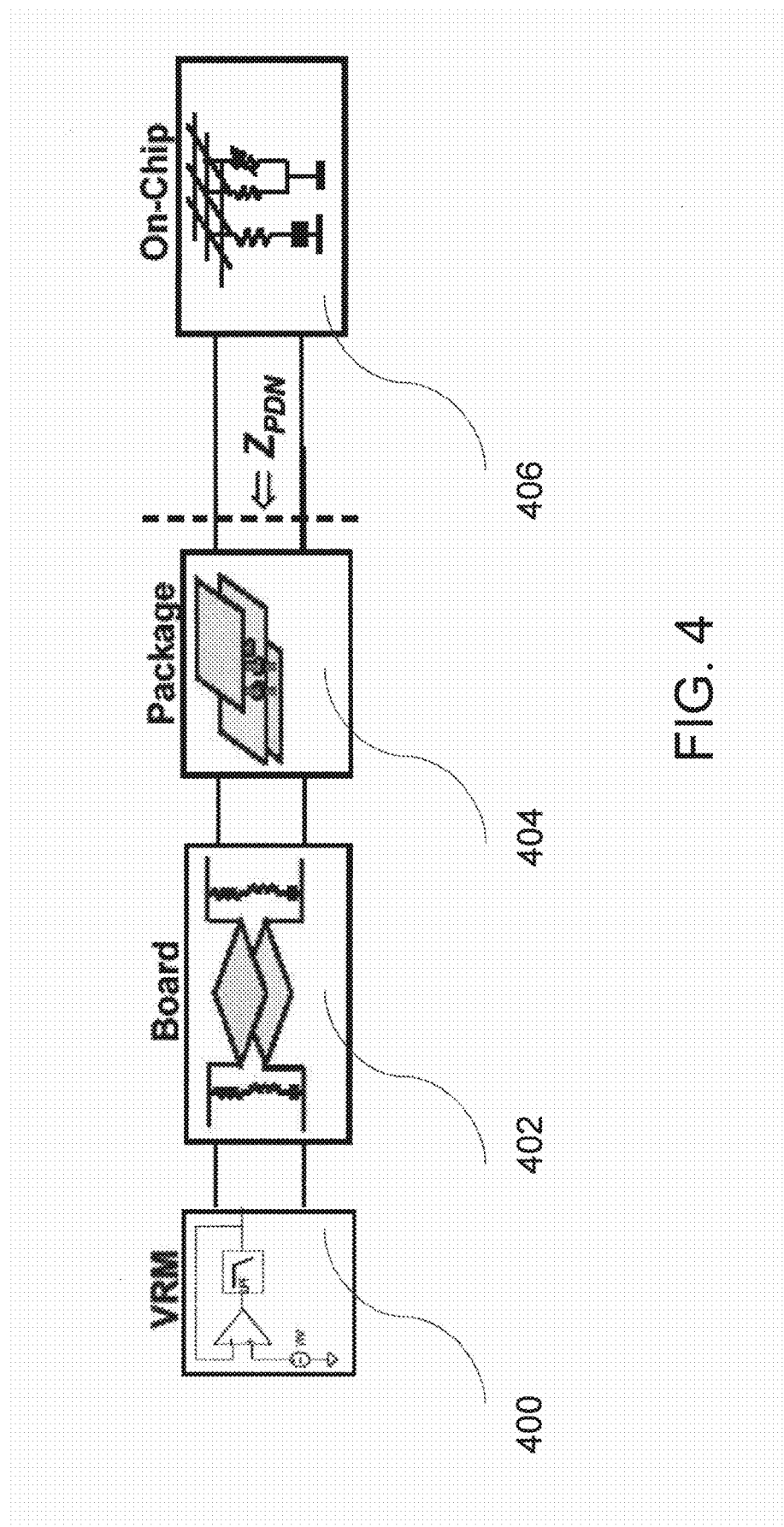
FIG. 4 is an illustrative diagram conceptually showing an exemplary approach to power integrity (PI) analysis for an electronic system design.

FIG. 4 illustrates an approach to power integrity analysis, which is generally carried out to verify the stability of supply voltage references as it is delivered from a voltage regulator module (VRM) 400 through the board and package models 402, 404 before reaching a logic chip core model 406. The output voltage delivered by the VRM 400 tends to become unstable when high switching current is generated in the chip core 406. Also, the dynamic load due to package/board power routing tends to cause varying dips in voltage and inductive resonance.

A typical power integrity analysis examines the quality of supply power distribution through a delivery network which includes a voltage regulator, intervening board/package power rail parasitics, a model for current consumption of the given die power grid, and decoupling capacitors. Typically, when analyzing PI in the prior art, no provision is made for mutual interference between the IO PDN and the core PDN. No adequate provision is made in the analysis for any coupled effects which may cause variation in the voltage carried on the power rail.

Current methodologies employed in the art use separate analyses to verify SI and PI. Each is analyzed without meaningful regard for the parametric intercoupling effects which cause the results of one to bear on the other.

Figure 5:
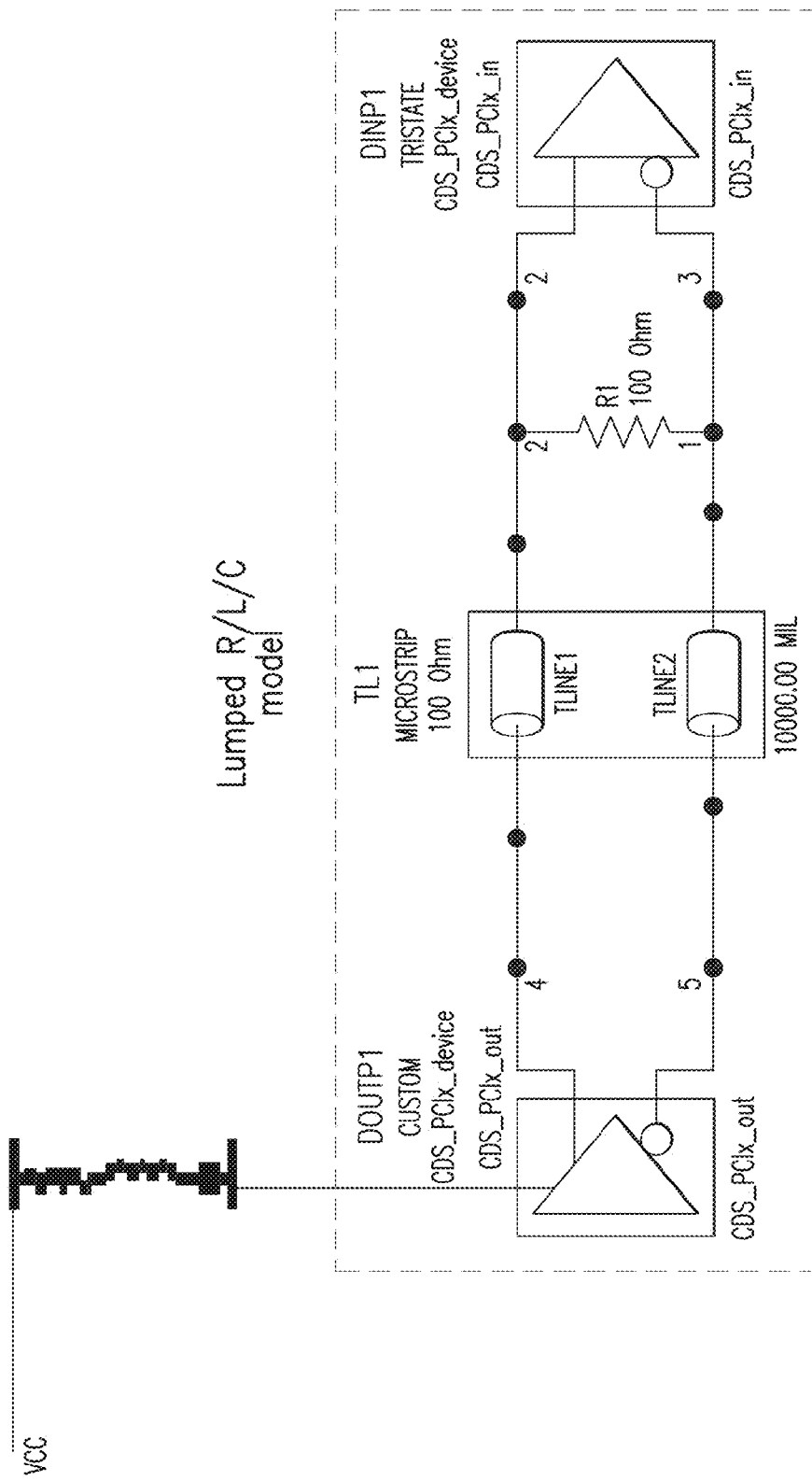
FIG. 5 is a schematic diagram illustrating the SI topology of FIG. 3, as utilized in a simultaneous switching noise (SSN) analysis for an electronic system design.

The known approach of SSN analysis does attempt to make some provision for non-ideal power rail conditions. SSN analysis serves to verify bounce from power-planes due to multiple IOs switching at the same time. FIG. 5 is an illustration of a time domain SI analysis. The SI topology used includes the signals on the bus, as well as the parasitics of the power rail supplying voltage to the IO buffer.

While SSN analysis takes the approach that the power rail model is no longer ideal, the analysis is still limited in accuracy. Users create PWL voltage waveforms from a PI analysis and make use of the same in subsequent SI analysis simulations. These PWL voltage waveforms, however, do not capture the true resonances and transient dips seen in actual operation, since they are generated taking just IC core PDN into account—without accounting for IO PDN or SI interconnect loading effects. Further, SSN analysis is carried out at the transistor level, making for much more cumbersome processing than analyses carried out at IBIS buffer model level of abstraction.

In many applications, it is desirable to perform early exploration as well as final verification of the coupled effects between the IO PDN, IC core PDN, and SI interconnects. Early exploration allows for the circuit designer to lay out the circuit network and the power distribution network in a way that minimizes the coupled effects.

Further, it is desirable to analyze the coupled effects between the IO PDN, IC core PDN, and SI interconnects at the IBIS buffer model level of the electronic system in question, rather than at the lower, and more tedious, transistor model level. IO buffers typically incorporate transistor circuits numbering in the hundreds to the thousands. Consequently, simulation at the transistor level takes considerably longer—prohibitively so in many applications—due to the great number of requisite device and interconnect models at that level. The available IBIS buffer models normally used in the art for buffer level simulation, however, are characterized at fixed, non-fluctuating supply references. Straight use of IBIS buffers as such ignores the real world loading/coupling effects discussed in preceding paragraphs, making for inaccurate, unreliable simulation results. The quick and efficient scaling of known IBIS buffer models realized in accordance with one aspect of the present invention to reflect observed or anticipated fluctuations in supply reference levels affords greater accuracy and reliability in simulation results.

Exploratory PI Topology Generation

Before the integrity of the power delivered through a power distribution network (PDN) of a package or circuit board may be accurately analyzed, the PDN must be properly modeled for such PI analysis. In accordance with an aspect of the present invention, the disclosed system and method take suitably into account not only the loading effects due to the given IC core current consumption, but other effects such as the loading due to the package/board interconnects being driven (through the given IO buffer). Additionally, the disclosed system and method provide convenient measures for placing decoupling capacitors in the modeled PDN to optimize its PI.

Figure 6:
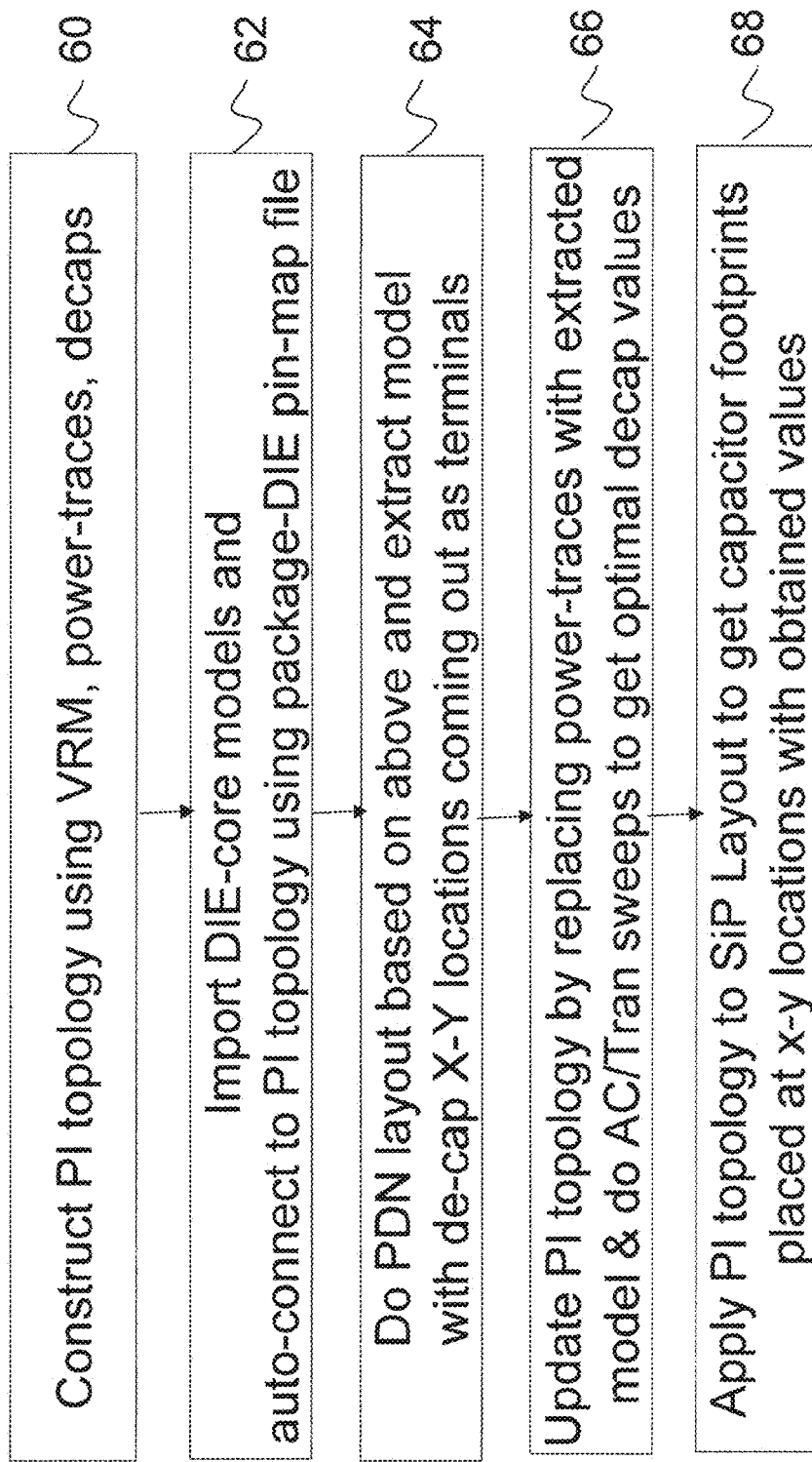
FIG. 6 is a flow diagram illustrating a flow of processes in a PI analysis carried out in an exemplary embodiment according to an aspect of the present invention.
Figure 7:
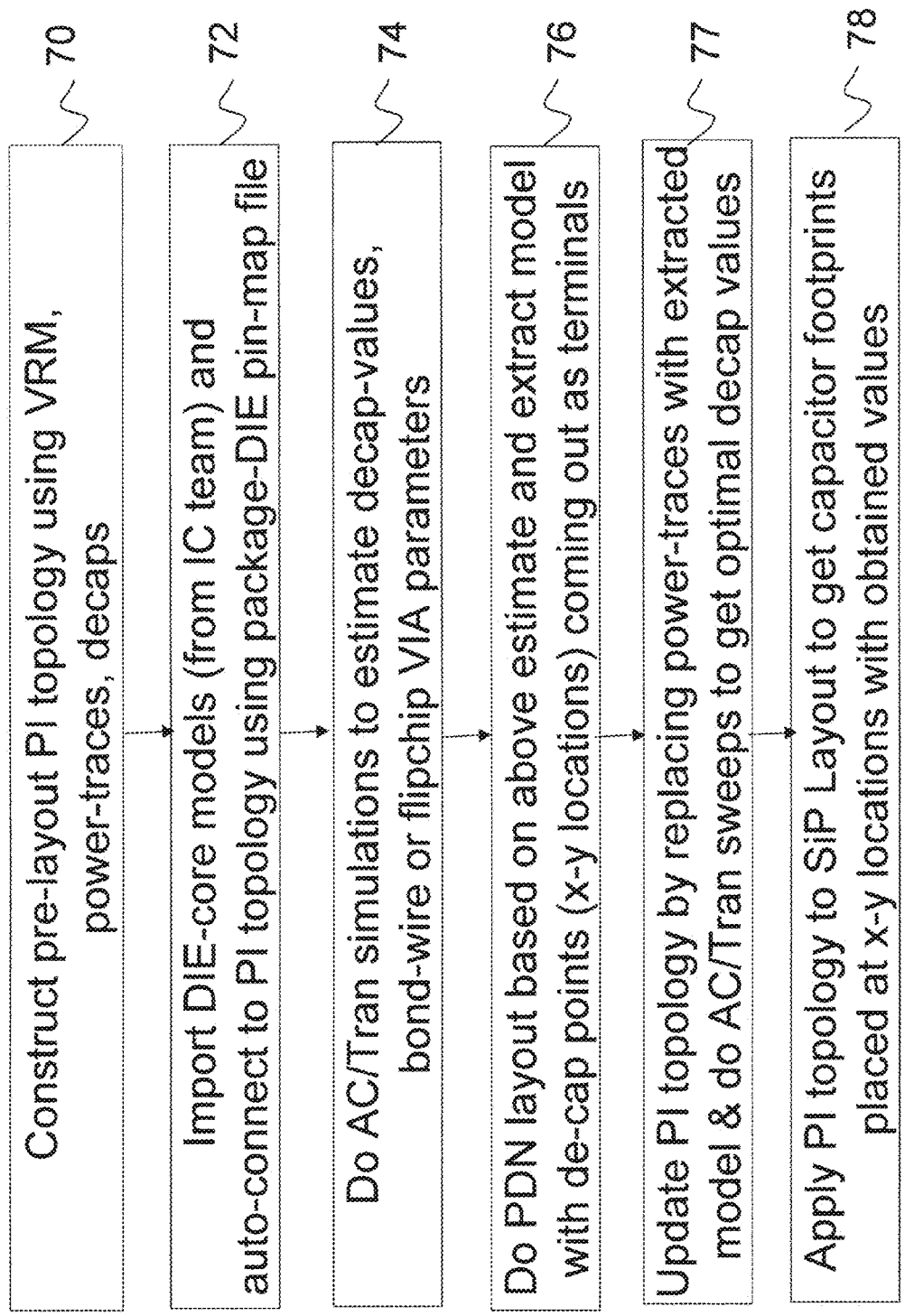
FIG. 7 is a flow diagram illustrating a flow of processes in a PI analysis carried out in another exemplary embodiment according to an aspect of the present invention.

Referring now to FIGS. 6-7, there are shown schematic diagrams illustrating the design flow in exemplary embodiments of the present invention. Briefly, the overall operation of an exemplary system and method formed in accordance with this aspect of the present invention is as follows:

The disclosed method provides for PI analysis by first constructing a PI topology which factors in not only the power plane of a given electronic system design, but also the loading/coupling effects contributed by virtue of the IC core and IO buffer, and interconnects with which it interacts. The PI topology accommodates an exploratory, what-if, approach to compensating a PDN model to optimize PI.

Preferably, the PI topology includes suitably interconnected models for: a voltage regulator module (VRM), power rail for the given PDN, one or more decoupling capacitors placed at strategic points of the given PDN, and the coupling effects due to the IO PDN and IC core PDN. The disclosed approach allows for an exploratory pre-layout that includes all the signal routing scenarios to be constructed by a designer before actual physical routing. Die models represent the current consumption of the die implementations for the given IC core and of the IO buffer serving the IC core. The die models (representing current consumption by the IC core) are usually provided by the IC team (or IC-Digital), or other such source for defining the interface protocol. The die models which may comprise thousands of pins may also be auto-connected to power trace models using a pin-map file to suitably map the thousands of pins to the power trace models. Once the connections between the die models and the PI topology are made, AC and transient simulation may be carried out using SPICE or any other such suitable simulation tool known in the art to estimate the decoupling capacitor values and footprints on the resulting layout. In this manner a PI topology, whose model reflects the real world effects of both IO PDN and IC core PDN, is realized. As described in following paragraphs, moreover, the PI topology is one which may be realized in exploratory manner, so that the user may populate the overall PDN with suitable combinations of decoupling capacitors for optimal PI.

Upon analyzing power integrity, suitable locations for decoupling capacitors to compensate for dips in voltage may be determined. Yet, in the prior art, before an extraction of the power rail model, decoupling capacitors are often placed at various locations based on some a priori design knowledge or experience. An extraction of the model is then made by a comprehensive solver simulation before simulation to analyze power integrity and verify whether the resulting voltage dips are tolerable. If the results of the power integrity analysis are unfavorable, the decoupling capacitors would then be modified in location, number, and/or value, and the model re-extracted. The iterative process of modifying the decoupling capacitor set, then re-extracting and simulating for PI re-analysis would continue until the results of the PI analysis were found acceptable. Such prior art process of largely trial and error analysis is highly inefficient, as each solver extraction and re-extraction process alone could easily consume hours to extract the PI models containing hundreds of decoupling capacitors.

In accordance with a further aspect of the present invention, before extracting the requisite model for the PI topology, the potential decoupling capacitor locations are substantially designated before extraction. Once the model is extracted, the designated decoupling capacitor locations are defined as terminals of the model. The designer is then afforded ready access to the terminals to selectively 'connect' (or parametrically activate) decoupling capacitors to the terminals for subsequent simulation runs. As simulation runs are considerably more cost effective (than extracting models) in time and processing power consumption, they may be run and re-run as necessary to identify the optimal arrangement of decoupling capacitors. If the location of a decoupling capacitor is found to be less than optimal, its location may be seemingly 'changed' by appropriately setting the appropriate decoupling capacitor values at the locations of interest. For example, a decoupling capacitor may be effectively relocated to another terminal by setting the appropriate capacitor value at one terminal location to a zero or other nominal value, while conversely setting the appropriate capacitor value at a different terminal location to a suitable non-zero value. In this way, the active 'locations' for decoupling capacitors may be easily be changed at the corresponding terminals without having to entirely re-extract a modified model.

By way of example, in the prior art a minimum of five power-plane extractions are typically needed to explore decoupling capacitor values and/or locations. Each extraction may take about 3 hours, resulting in about 15 total hours for the five extractions. The extractions are followed by about 100 SI simulation sweeps at typical, minimum, and maximum voltages. Each SI simulation sweep for a power plane extraction might take about 6 seconds, which results in about 30 minutes for the 100 SI simulation sweeps. Thus, it would easily take approximately 15½ hours to extract and simulate a non-optimal design that might barely meet the given requirements.

Figure 9:
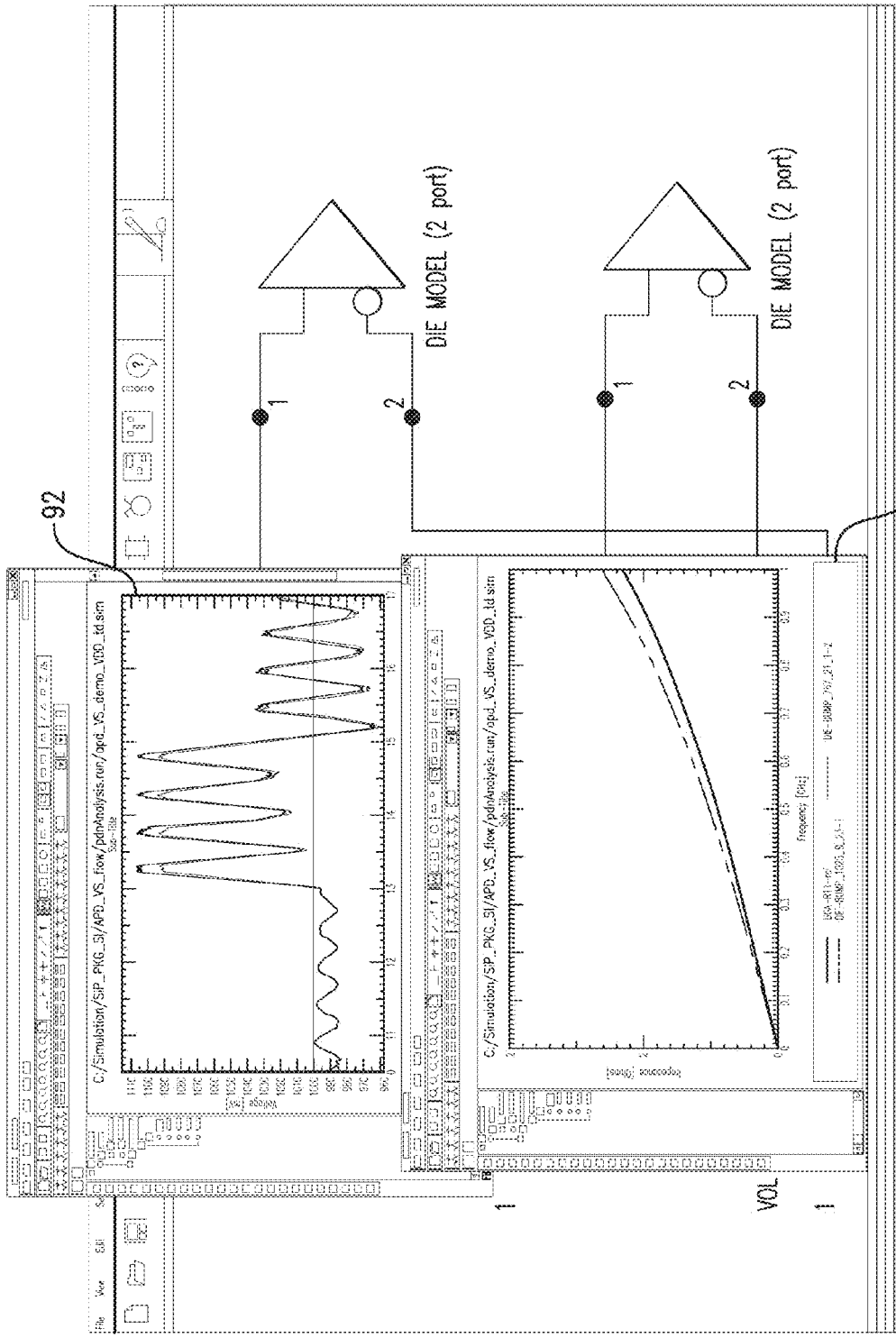
FIG. 9 is an illustrative representation of a graphic user interface generated during computer simulation incorporating the PI topology illustrated in FIG. 8.

The subject system and method enable the realization of an optimal design in a fraction of the time required by the prior art approach. Only one power-plane extraction is needed to carry out the AC/transient-sweeps (such as illustrated in FIG. 9) necessary to optimally set decoupling capacitor values and arrangement. The initial power-plane model extraction may take longer than in the prior art approach, as every potential location for a decoupling capacitor is preferably considered, and designated a terminal. In contrast to the prior art approach in the preceding example, a comparable initial extraction in accordance with the present invention may take, for instance, about 5 hours. After the extraction, about the same 100 SPICE simulations as in the preceding prior art example, would then be performed. The simulation sweeps will preferably be a about 10 times slower than the SI simulation sweeps performed in the prior art example, as the simulation sweeps would be for unified SI/PI analysis (as described herein according to another aspect of the present invention). This would result in about 1.6 hours of SPICE simulation time, which means that it would take a total of about 6.6 hours (or nearly 9 hours less than in a comparable prior art approach) to extract and simulate an optimal, accurately analyzed design.

Referring more specifically to FIG. 6, there is illustrated a method according to one exemplary embodiment of the present invention. The method provides for the simulation and extraction of a composite PI topology having die models, package models, and board models incorporated therein.

The prior art approach to PI analysis across an IC, package, or board generally is to apply the decoupling capacitors in some predetermined manner, then extract the N-port power rail model. After the extraction, the power rail model is simulated with VRM voltage and dummy loads. The result of the package model is then handed to the IC team to verify power integrity at the IC level in context of the package model. This requires the designer to recreate the package-power rail model for every change in decoupling capacitor location and/or value. This time consuming process makes it very difficult to explore decoupling capacitor values.

With respect to FIG. 6, a PI topology is constructed as a composite model with potential decoupling capacitor x-y locations represented as interface points of the package-model. In Block 60, the PI topology is populated with a VRM configured to provide the required voltage reference and a package model interconnected thereto which models the power rail of the given PDN. The package model may be obtained using a power-plane interconnect library of elements modeling length, thickness, and other such parameters characterizing physical interconnections to the power rail, and power via parameters (for flip-chip power rail connections) such as via count, diameter, and drill. In Block 62, the die core models which characterize the current consumption of die implementations for the given IC core and associated IO buffer are imported into the package model and automatically interconnected to the power rail package model. The interconnections are made preferably with reference to a package-die pin-map file. As indicated at block 64, a power delivery network layout is then configured with prospective x-y locations for decoupling capacitors referenced in the layout. A suitable 2-dimensional or 3-dimensional field solver known in the art is then executed to extract a composite power rail model for the PI topology, with all prospective decoupling capacitor locations coming out as interface ports (terminals).

The decoupling capacitor x-y locations are determined based on proximity to VCC/GND pins in the PDN layout. Preferably, all die pins representing DC power (VCC/GND) are made default locations for decoupling capacitors with the user having the ability to override or add more locations. In Block 66, the PI topology is updated by replacing the package model (for the power rail traces) with the model extracted by solver simulation, then AC and transient simulation sweeps are carried out with the updated PI topology to determine optimal decoupling capacitor placement and values. In Block 68, the PI topology is thereafter applied to the given system-in-package (SiP) layout, whereby decoupling capacitor footprints are placed and connected accordingly at the selected ones of the prospective x-y locations at the optimal values verified by the AC/transient simulation sweeps on the same. The decoupling capacitors are also added to the logical design as design instances. The PI topology may exported to the IC designer, defined in terms of: its power rail package model (whose layout has been edited to reflect the final decoupling capacitor placement) as an S-parameter or R/L/G/C/K sub-circuit; interconnections between its VRM, power rail, and die models, its decoupling capacitor models and respective x-y locations; and, its power rail package model-to-die models interconnection pin-maps.

Among other things, such application of a PI topology realized in the manner disclosed herein on a layout of a given electronic system determines the routing schedule of power rails, in addition to establishing decoupling capacitor locations. It also sets the dimensions and count of any via's connecting a power rail to reference power planes such as VCC/GND planes, and establishes bond wire lengths for the power rails.

FIG. 7 illustrates an embodiment similar to that of FIG. 6 for PI exploratory analysis. A pre-layout PI topology is established in Block 70 to initially include a VRM model and a package model for the prevailing power rail, and models for any pre-established decoupling capacitors. In Block 72, the die core models corresponding to the IC core PDN and IO PDN are imported and automatically interconnected to the power rail package model, preferably as prescribed by a corresponding package-die pin-map file.

The resulting pre-layout allows designers an opportunity to experiment with PI topology. The package model(s) is pre-established from known library elements for wire bonds, decoupling capacitor values, flip chip via parameters, etc. Pre-establishing such models of library elements allows the designer to add on to the PI topology to determine the best way of laying out the library elements to meet the required specifications.

For example, assuming that there are 10 dies for which the designer had to provide power, the designer may estimate how best to branch out the power trace of the power delivery network to adequately supply the dies. In the best case scenario, the designer may have 10 different routes from the voltage regulator to feed the IC dies because each trace is independent of the others. The non-optimal, worst case design scenario would occur when a relatively large trace encircles the given PCB before feeding into a small core power plane to distribute power to the 10 different IC dies. The design would be non-optimal, as the relatively large trace would be heavily loaded due its having to supply power to all 10 dies. The pre-layout PI topology allows a designer to determine an optimal location for the power plane before extraction.

In this regard, AC and transient simulation sweeps are carried out in Block 74 on the composite model for the PI topology obtained at Block 72 (using SPICE or other suitable simulation tool known in the art). Preliminary estimates for the combination of required decoupling capacitors and their values are obtained by such simulation, as are bond wire parameters, flip chip via parameters, and the like for pre-layout update of the PI topology. A power delivery network layout is then formed in Block 76 based on these estimates, and passed on to the field solver to extract a composite model having the potential decoupling capacitor x-y locations emerging as interface terminals thereof.

As in the preceding embodiment, x-y locations for the decoupling capacitors in the PDN layout are preferably determined based on their proximity to the VCC/GND pins, with all die pins representing DC power (VCC/GND) initially set as default locations. The user would then have the ability to override or add more locations.

In Block 77, the PI topology is updated by replacing the power rail package model with the extracted model, and a series of AC/transient simulation sweeps are run as needed to obtain optimal decoupling capacitor values. In the course of running such simulation sweeps, a user may variously apply decoupling capacitors at selected sets of terminals in the PI topology to arrive at optimal results.

In Block 78, the resulting PI topology is applied to the given electronic system's package design. The decoupling capacitor footprints are placed and connected to the SiP layout at their respective x-y locations. The decoupling capacitors are also added to the logical design as design instances.

The described methodologies in FIGS. 6 and 7 offer a designer the advantage of having to only generate a package model once with all the decoupling capacitor locations represented as ports of a solver extracted model. The user may then apply decoupling capacitors to the PI topology in selective manner, quickly verifying the configuration with AC/transient simulation. This allows for exploratory analysis to determine the topology required for optimal PI.

Figure 8:
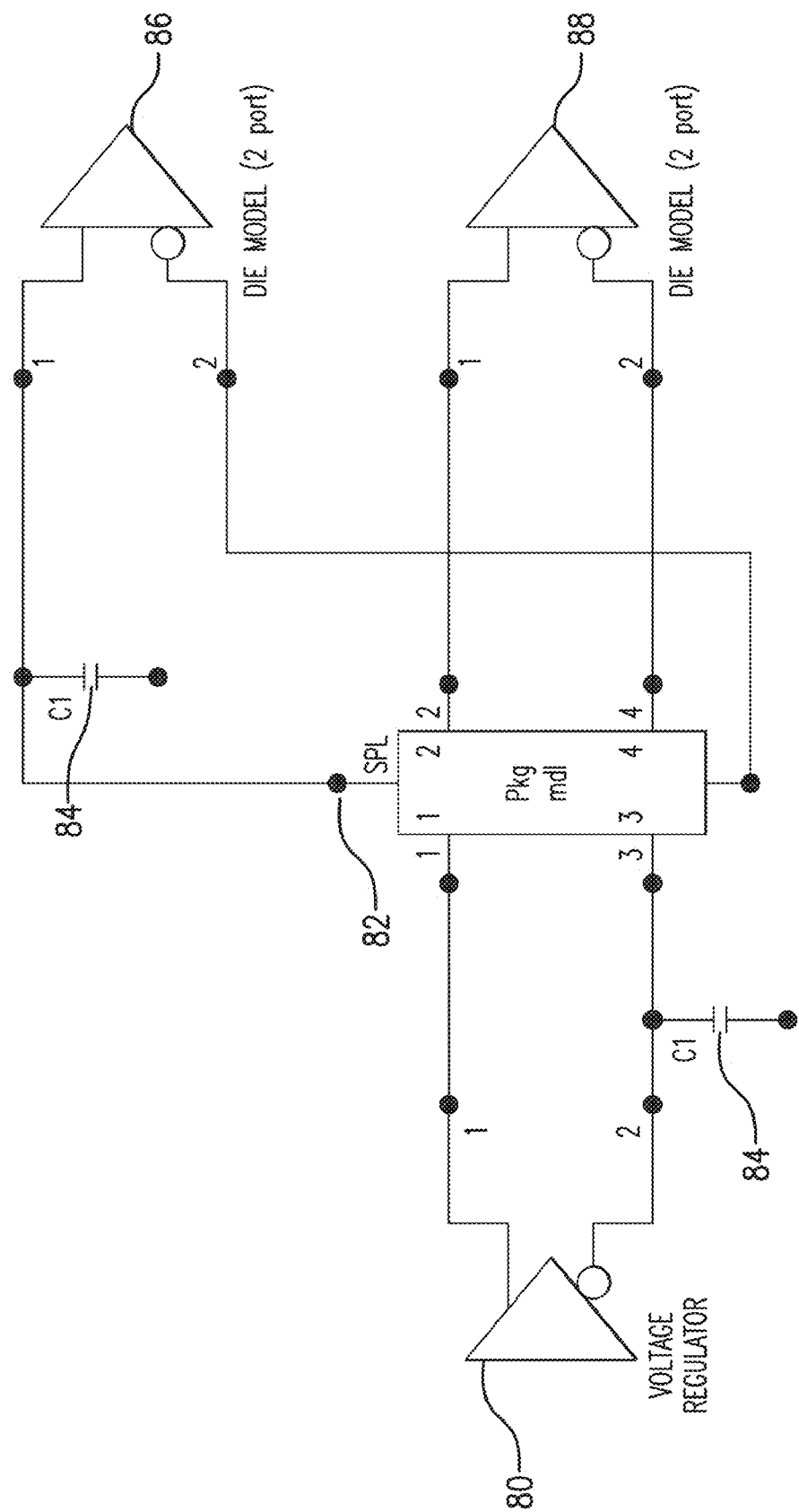
FIG. 8 is a schematic diagram illustrating an exemplary PI topology constructed according to one of the embodiments illustrated in FIGS. 6-7.

FIG. 8 graphically illustrates an interconnection of models in a PI topology constructed generally in accordance with the embodiments illustrated in FIGS. 6-7. In constructing the PI topology, a suitable VRM model 80 is incorporated into the topology, interconnected with a power rail package model 82 and the requisite decoupling capacitors 84. The die models 86, 88 are preferably imported from an IC team or other suitable source. Die model 86 represents the current consumption and other coupled effects reflected in the IC core PDN, while die model 88 represents the current consumption and other coupled effects reflected in the IO PDN. Each die model 86, 88 typically comprises thousands of pins, and in the preferred embodiment, a package-die pin-map file is used to map the die pins to the power rail package model. Once the mapping is made and the die models 86, 88 are properly interconnected to the package model 82, a field solver is run on the corresponding PDN layout to extract a composite power rail model for the PI topology having terminals for selective connection of decoupling capacitors thereto. AC/transient simulation runs may then be performed on the composite model to determine the optimal combination of decoupling capacitor 84 and their values to finalize and apply the PI topology to the electronic system design at hand.

The schematic representation of the PI topology example shown in FIG. 8 may comprise a portion of a graphic user interface displayed for the user of a system formed in accordance with the present invention. The models included in the topology are represented symbolically, and their functional interconnections represented in simplified schematic form. A user may select and manipulate a graphic display of the topology as shown to interactively reconfigure and use the topology as described herein.

FIG. 9 illustrates a graphic user interface window generated during operation. In the illustrated example, windows 92, 94 graphically representing the simulated waveforms in connection with AC and transient simulation based on the PI topology of FIG. 8 are displayed for the user superimposed over the graphic view of the topology itself.

Figure 10:
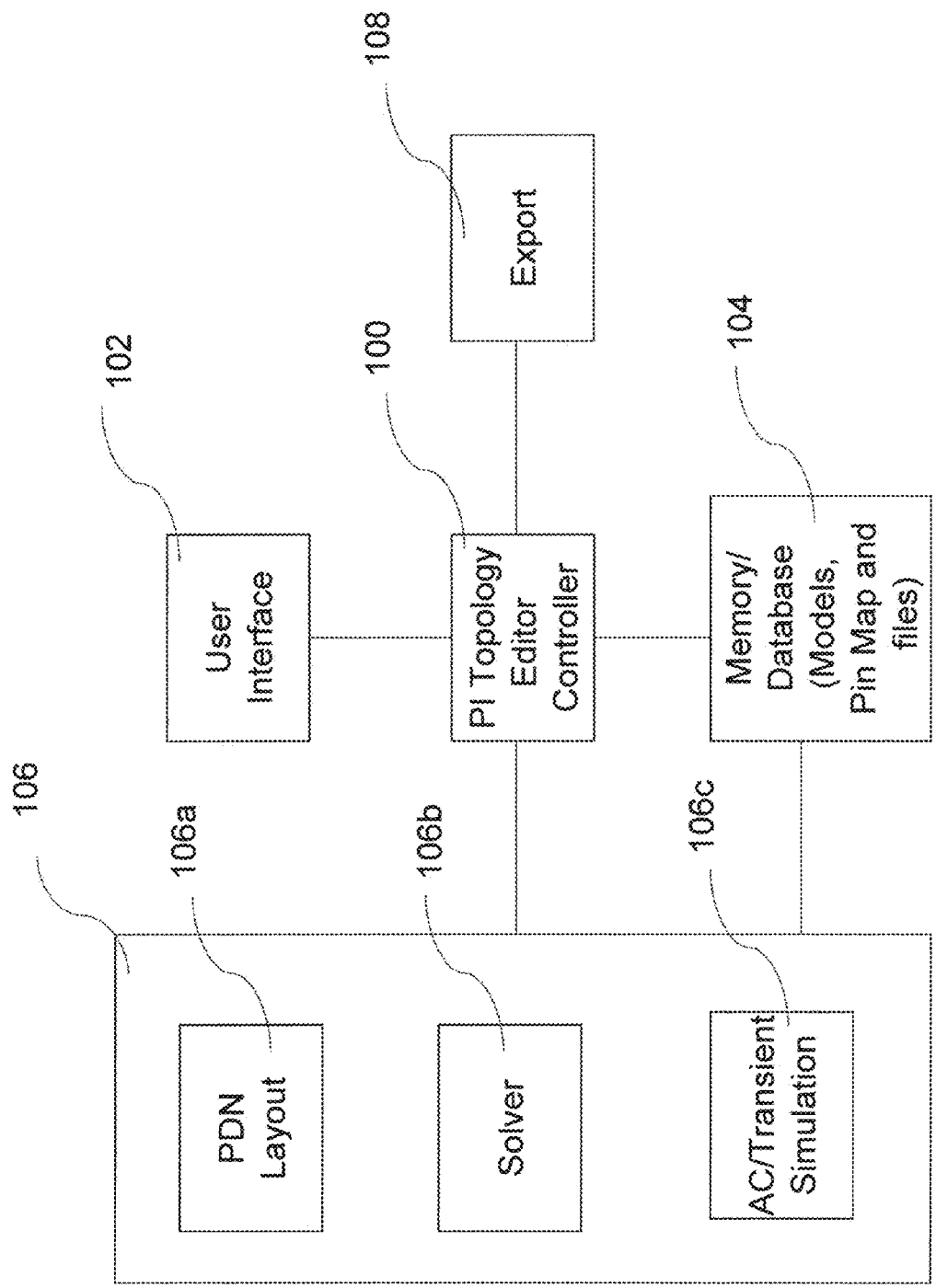
FIG. 10 is a block diagram illustrating an interconnection of units in an exemplary system formed in accordance with one of the embodiments reflected in FIGS. 6-9.

Referring now to FIG. 10, there is shown a block diagram illustrating an interconnection of units in a system functionally implementing the various embodiments illustrated in FIGS. 6-9. As shown, a microprocessor-based PI topology editor and controller 100 is employed to provide general control of the creation, editing, and utilization of PI topologies as described in preceding paragraphs. A user interface unit 102 coupled to the controller 100 includes suitable display, data entry, and other measures to provide a graphic user interface whereby a user may view, read, and enter information pertaining to the PI topologies at hand. The user interface unit 102 provides convenient measures for the user to interactively control the exploratory process of creating and optimizing a PI topology as described herein. A memory/database unit 104 either stores or provides access to remotely stored data required by the different units of the system. For example, the different models imported into the PI topology, the pin-map files or other data for layout interconnection, and the like accessed during the PI topology construction, editing, and verifying are preferably provided through the memory/database unit 104.

The various automated tools 106 utilized in carrying out the processes illustrated in FIGS. 6-7 are coupled for access by the PI editor and controller unit 100. The tools 106 may include any suitable set of subsystems, facilities, or resources known in the art. They may include in the illustrated embodiment, for example, a PDN layout generation facility 106a, a 2-D or 3-D field solver 106b for extracting parametrically defined models of a given layout, and a simulation facility 106c for carrying out user-prescribed AC/transient simulation sweeps.

An export unit 108 is preferably coupled to the PI editor and controller unit 100 for delivery of the PI topologies for further use. In the illustrated embodiment, the export unit 108 may provide the properly formatted definition of a PI topology for seamless incorporation into a given SiP and/or board layout.

Unified PI and SI Analysis in Integrated Environment

Figure 11:
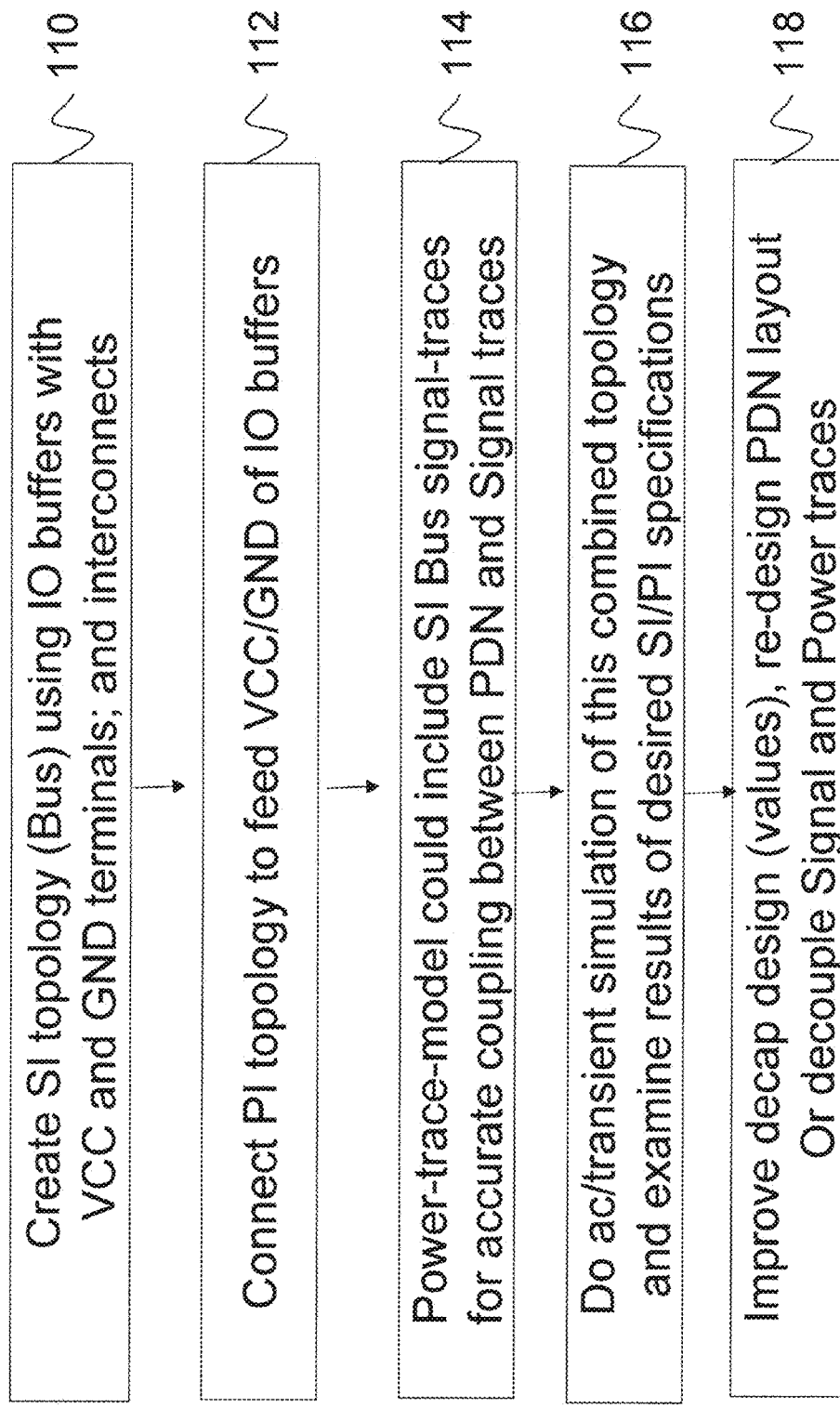
FIG. 11 is a flow diagram illustrating a flow of processes in analyzing SI in an environment parametrically integrated with a corresponding PI analysis according to an exemplary embodiment of the present invention.

Referring now to FIG. 11, there is shown a flow diagram illustrating a flow of processes in a system and method formed in accordance with a further exemplary embodiment of the present invention. The disclosed process provides for SI analysis in the context of realistic variation in the supply power reference levels. That is, a topology representing the electronic constituents for comprehensive SI analysis is coupled to a PI topology constructed as described in preceding paragraphs for simulated SI analysis which reflects the variations in the power reference voltages under actual operating conditions.

The SI topology is preferably constructed using IO buffers having respective power-pin connections to be fed by VCC/GND power rails of the PI topology, rather than by ideal sources providing fixed reference levels. Further, the IO buffers are therefore fed VCC/GND values that dynamically vary in condition-responsive manner according to the real world coupling effects emulated in the PI topology. SI analysis is performed subject to concurrent PI analysis for the PDN(s) serving and affecting the IC core(s) in question. The SI analysis is thereby made to reflect such real world factors as VCC/GND fluctuations in the power rail due to the IC core's current consumption. The SI analysis is thereby also made to reflect the reciprocal effects had on the IC core's ongoing operation by the voltage fluctuations. The voltage fluctuations are further modulated by the loading effect of the IO buffer current draw in driving an output load.

Figure 13:
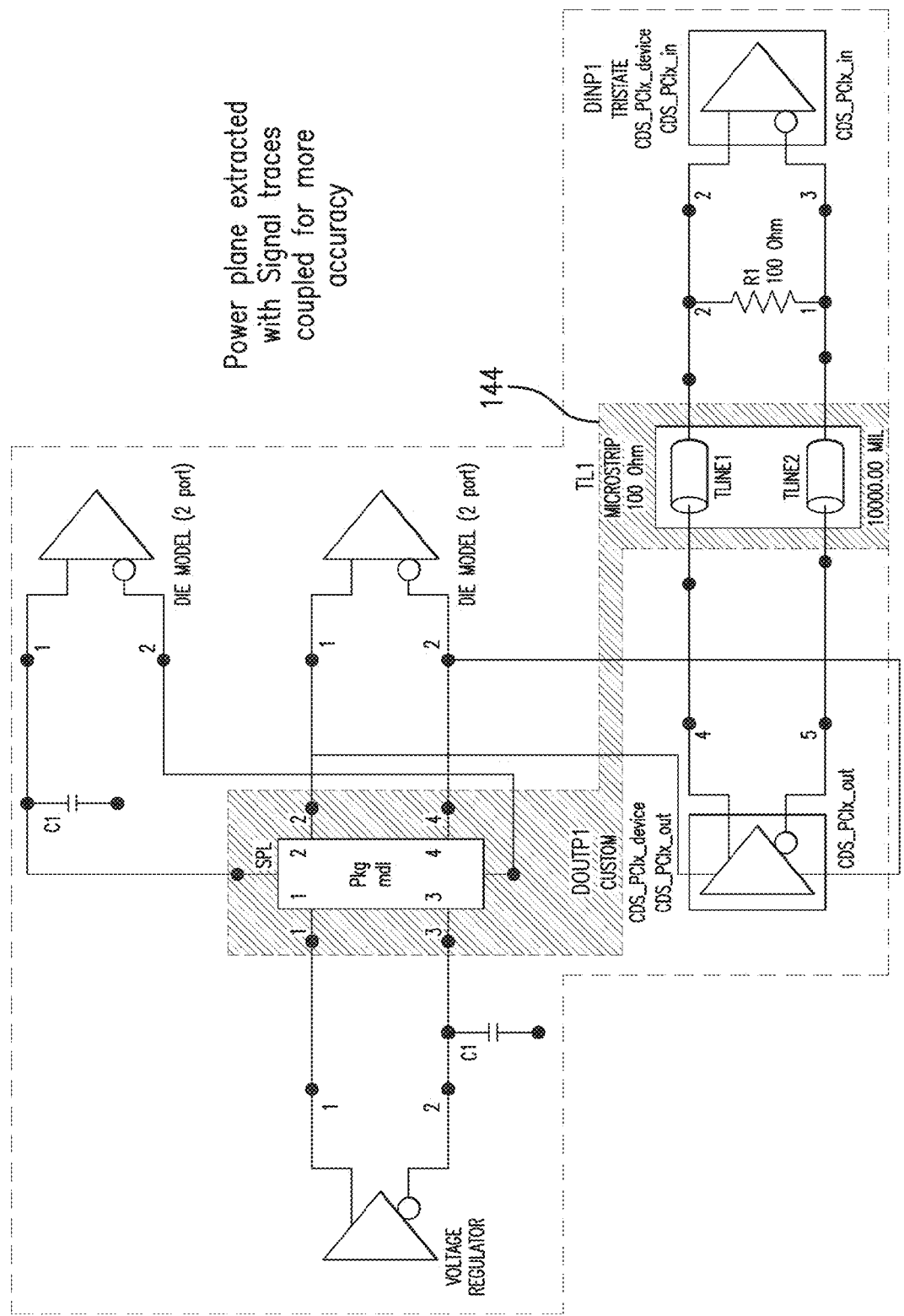
FIG. 13 is the schematic diagram of FIG. 12, illustratively marked to identify a portion of the combined topology for power plane solver extraction.

Referring more specifically to FIG. 11, in Block 110 an SI topology is created using IO buffer models having VCC/GND terminals. Bus signal traces, or interconnects, are included in the SI topology modeled as transmission lines between the IO buffer models. In Block 112, the power rail of the associated PI topology is connected to feed the VCC/GND connections of the IO buffer models of the SI topology. In Block 114, the SI topology bus signal trace models may be included in extracting the power rail model for the associated PI topology (as illustrated in FIG. 13) to account for the coupling between the power delivery network and the signal traces.

AC and transient simulation is then performed in Block 116 using SPICE or other such suitable simulation tool on the combined SI/PI topology. In Block 118, the results are analyzed to determine if changes need to be made to the decoupling capacitor values or if the PDN layout needs to be redesigned. The results will also indicate if there is any undue coupling between the signal and power traces.

The combined SI/PI topology enables concurrent simulation sweeps to be carried out without precluding their parametric interdependencies. Condition-responsive dips in the supply voltage references realistically reflected in the PI topology are conveyed to the SI topology as they occur during simulated operation of both. The power plane model extraction for the PDN may also include the transmission line models of the bus signal traces in the SI topology, such that the extracted model duly reflects their parametric coupling effects.

As mentioned, the known approaches to analyzing PI do not adequately account for the effects of signal loading (bus) from the package or board. Thus, the isolated analysis of SI cannot properly account for the parasitic effects of the power rail due to the IC core loading. Additionally, independent analysis of PI fails to take adequately into account the loading due to IO buffers driving signals on the package outside the IC core. Concurrent simulation on both the SI and PI topologies and the solver extraction of the PI power plane coupled with the SI signal traces address these deficiencies.

Figure 12:
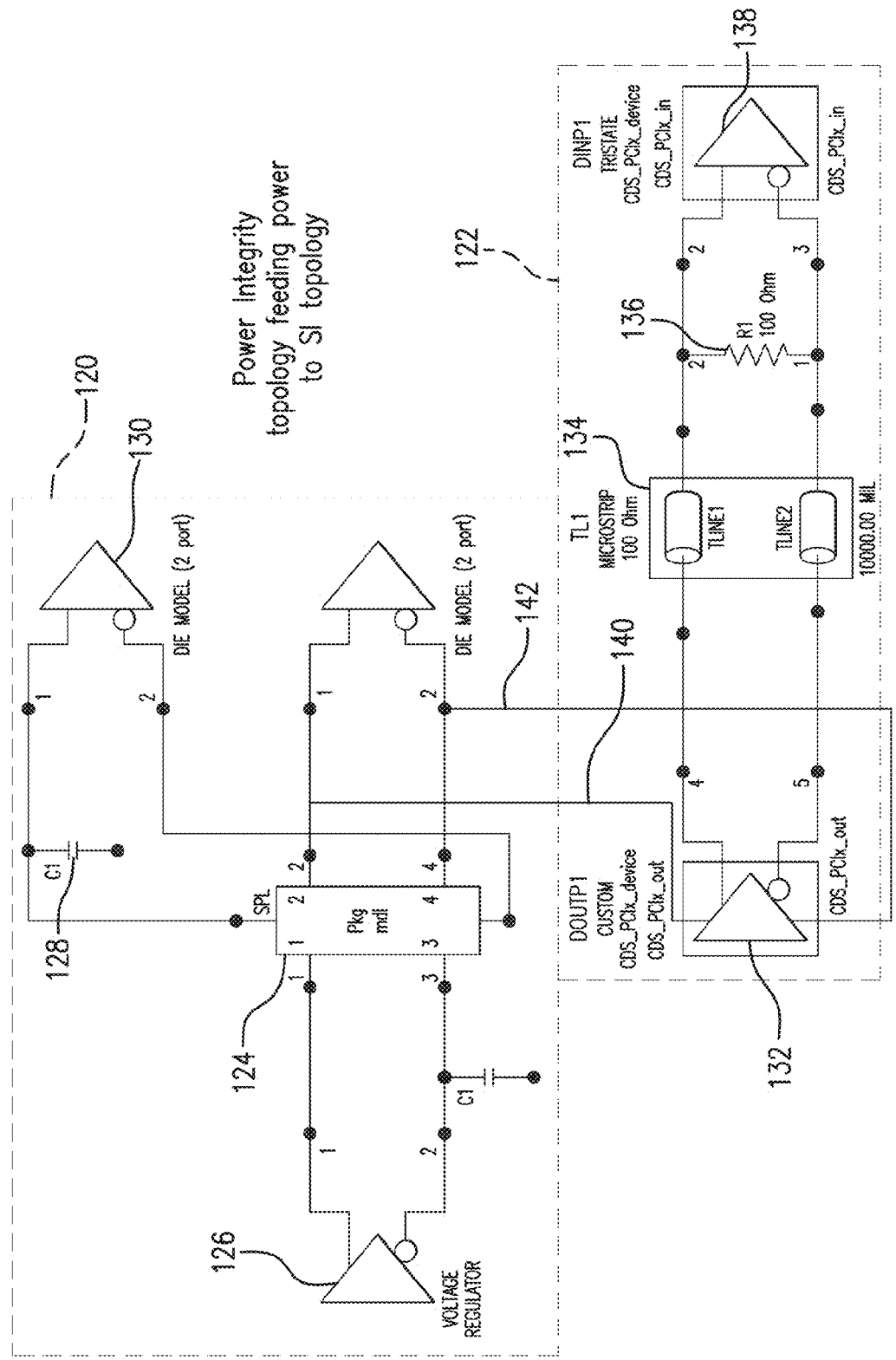
FIG. 12 is a schematic diagram illustrating a combined topology integrating an exemplary SI topology with a corresponding PI topology.

A unified SI/PI analysis carried out in accordance with the present invention accounts for the effects of the SI signal traces on the package power rail, loading effects on the PI topology due to the SI topology, and loading effects on the PI topology due to the current consumption by multiple die-cores connected to the package power rail. Referring to FIG. 12, a unified SI/PI topology formed in accordance with an exemplary embodiment of the present invention is shown. The PI topology portion 120 preferably includes a voltage regulator 126 that supplies a steady DC reference voltage, a power rail model 124, decoupling capacitors 128, and die models 130. The output voltage of the power rail 124 is attached through a VCC connection 140 to the input of the IO buffer 132 in the SI topology 122. The VCC connection 130 along with the GND connection 132 supplies the power rail output voltages from the PI topology to the SI topology portion 122.

The SI topology 122 includes interconnects 134 that serve as transmission lines to the plurality of IO buffers 132, a termination 136 that serves to mitigate reflection of the signals on the transmission line, and a receiver IO buffer 138 that receives the signals being driven by IO buffer 132.

For heightened accuracy of results generated by unified SI/PI topology analysis, the model for PI topology's power plane 144 may be extracted along with the signal traces of the associated SI topology. This is illustrated in the schematic diagram of FIG. 13, where the transmission line models for the SI bus signal traces are combined with the PI power plane 144 for solver extraction. The combined model that is extracted by the given solver will then reflect the RLC coupling effects of the SI signal traces on the PDN of the PI topology.

The schematic representations of the combined SI/PI topology example shown in FIGS. 12-13 may comprise a portion of a graphic user interface displayed for the user of a system formed in accordance with the present invention. The models included in the topology are represented symbolically, and their functional interconnections represented in simplified schematic form. A user may select and manipulate a graphic display of the topology as shown for interactive reconfiguration (if necessary) and use the combined topology as described herein.

The system may be implemented in a system which shares some or all of the interconnected units illustrated in FIG. 10. For example, the editor/controller 100 may be programmably configured to formulate the SI topology, PI topology, and composite SI/PI topology, while the user interface unit 102 provides interactive access by the user thereto. The tools, resources, and facilities available in unit 106 may be suitably utilized by the editor/controller 100, with reference to the supporting database 104.

Adaptive Reconfiguration of Known Buffer Models

Figure 14:
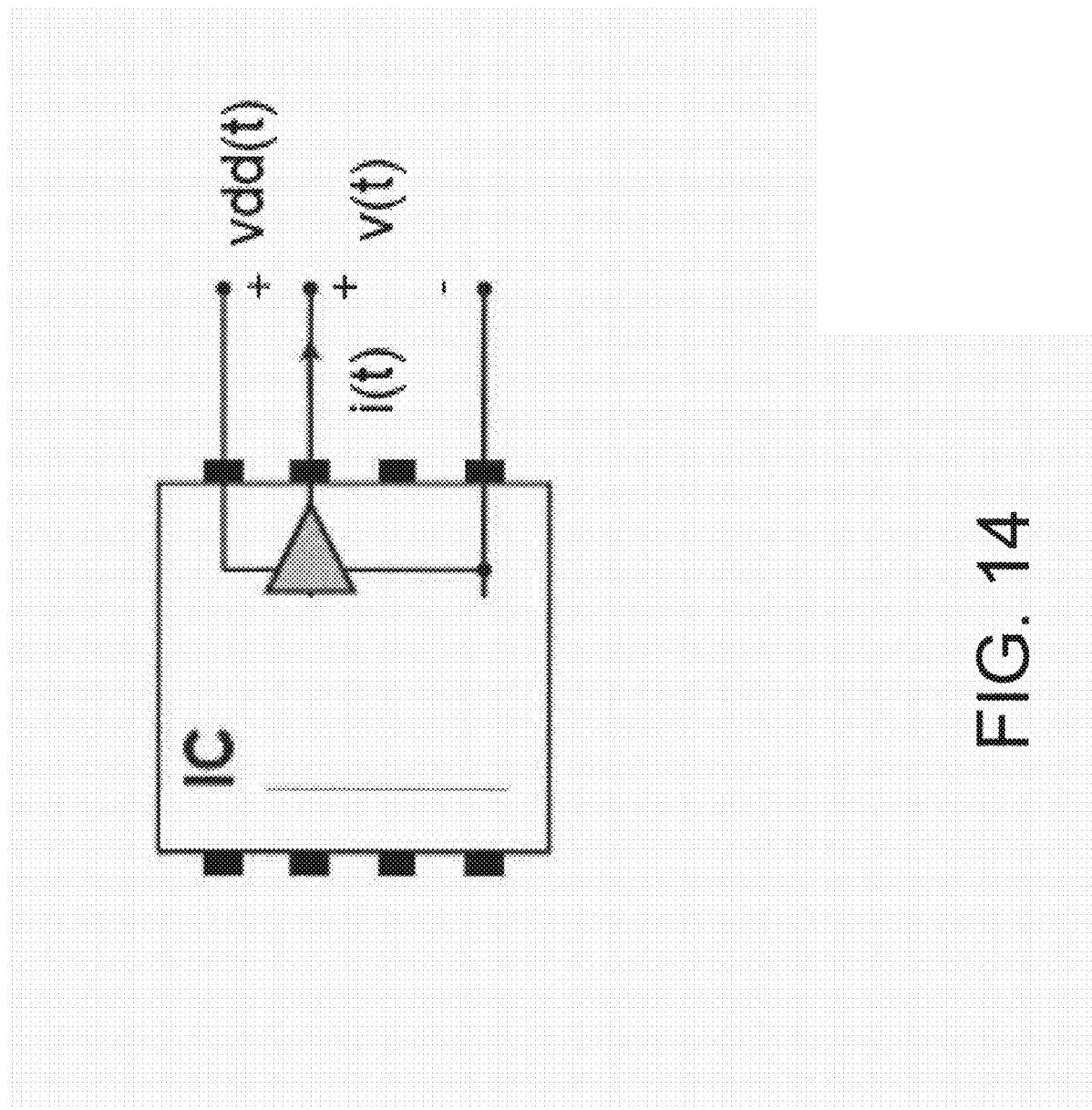
FIG. 14 is a schematic diagram illustrating an exemplary behavioral IO buffer model used for simulation of an electronic system design.

FIG. 14 schematically illustrates a behavioral IO buffer model that models the input voltage changes due to loading at the output of the IO buffer. The current SI analysis approach uses IBIS models, which are by definition characterized at specified supply voltage references fixed in value.

IBIS I/O models are typically defined by ASCII files which include behavioral information for modeling various integrated circuit devices. The ASCII files provide the analog input and output characteristics of integrated circuit devices for their modeling without divulging their proprietary circuit designs. The models are provided as simple table-based buffer models whose characteristics emulate those of the modeled devices. In addition to being quite accurate, such IBIS I/O models enable considerably faster simulation than if simulation were conducted on corresponding transistor level circuits of the same.

The accuracy of IBIS I/O buffer models of the type typically employed has its limits. The specification of each model is precisely obtained under carefully controlled, pre-set parametric conditions. Parameters such as the VDD and GND power levels are kept fixed at pre-set levels while the analog behavior of a buffer circuit is characterized in developing its IBIS model. Consequently, when the IBIS model is utilized under conditions where these parameters deviate from the pre-set levels on which their modeled behavior is premised, the modeled behavior itself becomes intrinsically flawed and cannot be relied upon.

Yet, the sets of available IBIS models are hardly enough to fully cover the range of variant levels encountered for such power level parameters in many applications, especially where the power levels vary dynamically from their intended levels. It is not feasible to replicate an IBIS model specifically with the varied power level conditions actually at hand. For one thing, the degree of time and effort required for a reliable model would be prohibitive in most cases. For another, the simple unavailability of the proprietary circuit design underlying the original IBIS model would make replication of the model under different parametric conditions speculative at best.

In accordance with an aspect of the present invention, therefore, the available IBIS models are adapted to suit the varying power level conditions encountered in a given application. A given IBIS buffer model is adaptively scaled to suit the prevailing conditions without having to re-create the entire model, and without having to guess at the proprietary aspects of the original circuit design from which the model was derived.

Figure 15:
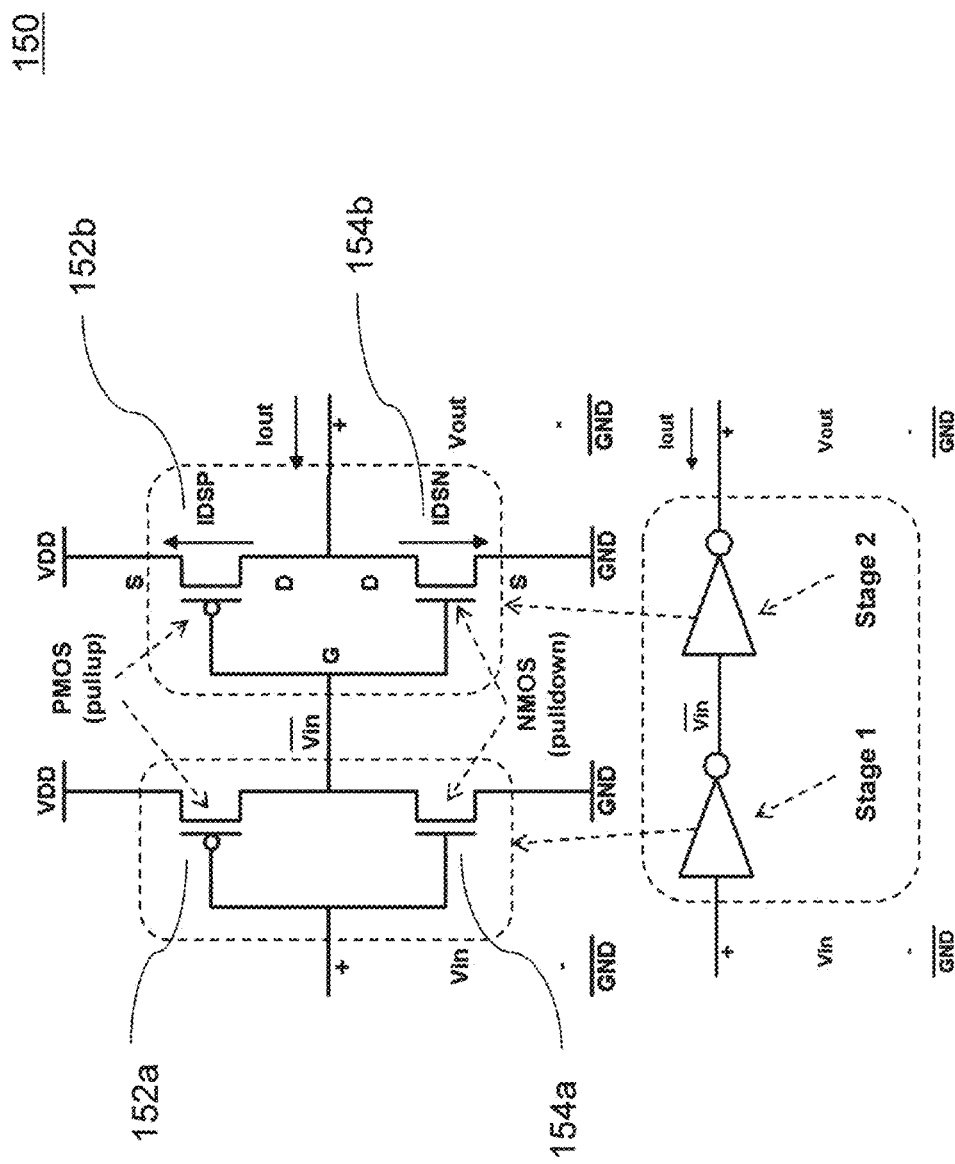
FIG. 15 is a schematic diagram illustrating an example of an effective CMOS buffer circuit behaviorally modeled by an exemplary IBIS IO buffer model.

Referring to FIG. 15, there is illustrated an example of a CMOS (complementary metal-oxide-semiconductor) equivalent circuit 150 for an I/O buffer whose analog response is behaviorally modeled by the given IBIS I/O buffer model. For clarity, the equivalent circuit is schematically illustrated both at a structural (transistor) level and at a device level (as a cascaded pair of inverter stages). At the structural level, the CMOS buffer 150 includes a pair of PMOS (positive-channel metal-oxide-semiconductor) pullup transistors 152a, 152b and a pair of NMOS (negative-channel metal-oxide-semiconductor) pulldown transistors 154a, 154b coupled as shown. Generally, an input voltage bit pattern applied at the input terminal as Vin is transferred by the equivalent circuit 150 to its output terminal as Vout, generating an output current Iout.

While only two sets of CMOS transistor devices are shown for illustrative purposes, equivalent circuits for other buffers may include greater numbers of transistor devices, and greater numbers of inverter stages. It is not uncommon for a suitable equivalent circuit 150 to include more than a hundred transistor devices in certain applications. The greater the number of transistor devices, of course, the greater the consumption of time and processing resources to adequately simulate the circuit at a structural/transistor level.

Figure 16A:
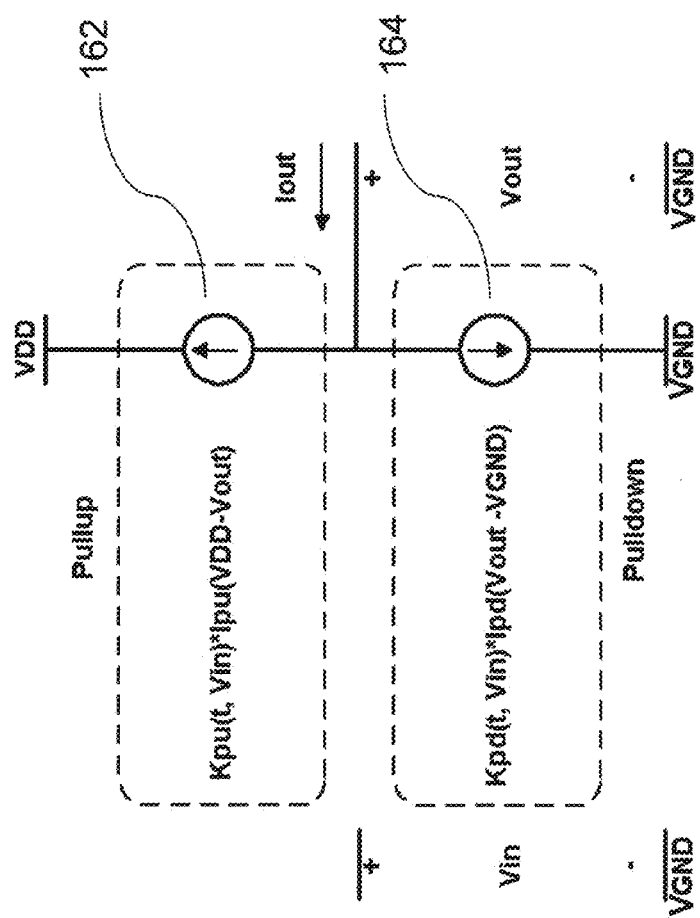
FIG. 16A-16B are schematic diagrams of an exemplary IBIS behavioral representation of an output stage of the effective CMOS buffer circuit of FIG. 15.

Use of an IBIS model in place of a transistor level circuit significantly reduces the requisite consumption of time and processing resources for suitable simulation. As illustrated in FIG. 16A, the IBIS standard effectively represents such CMOS equivalent buffer circuits as shown in FIG. 15 with a buffer model 160 having a pullup VCCS 162 (voltage controlled current source) and a pulldown VCCS 164 coupled as shown. An input voltage bit pattern applied at the input terminal as Vin would be transferred by the model 160 to its output terminal as Vout, generating the output current Iout. The current Ipu modeled by the pullup VCCS 162 would correspond to the drain-source current IDSP flowing through the pullup PMOS transistor 152b in the output stage of circuit 150, while the current Ipd modeled by the pulldown VCCS 164 would correspond to the drain-source current IDSN flowing through the pulldown NMOS transistor 154b in the output stage of that circuit 150.

The ASCII files defining a particular IBIS I/O buffer model include a pullup Current-Voltage (I-V) table which characterizes the DC current Ipu as a function of Vout relative to a fixed VDD level, when the pulldown VCCS 164 is turned off. That is, when Vin is at a 'High' logic level and IDSN=0. The IBIS model also includes in its defining files a pulldown I-V table which characterizes the DC current Ipd as a function of Vout relative to a fixed ground level voltage (referred to in the equations shown as VGND, to indicate a possible non-zero voltage level for GND), when the pullup VCCS 162 is turned off—or when Vin is at a 'Low' logic level and IDSP=0.

The files of the IBIS model further include tables which characterize the given buffer's transient behavior over rising and falling transition times. A pair of rising and falling Voltage-time (V-t) tables are provided for each of the pullup and pulldown VCCS devices 162, 164 as Vin rises from a 'Low' logic level to a 'High' logic level, or as Vin falls from the 'High' logic level to the 'Low' logic level. As is known in the art, the I-V and V-t tables are suitably established under controlled 'laboratory' conditions (or upon comprehensive structure level circuit simulation) according to the IBIS specification applicable to the given IBIS model.

Transient coefficients Kpu, Kpd may then be determined in a suitable manner known in the art, based on time (t) and Vin, from the corresponding set of rising and falling V-t tables. These transient coefficients Kpu, Kpd are respectively applied as indicated in FIG. 16A to modulate the pullup and pulldown VCCS currents Ipu, Ipd.

Recent developments in the art in connection with the IBIS standard provide for the inclusion in the defining files of certain IBIS models effective saturation currents which model the cumulative current draw resulting from such real world operational factors as the simultaneous switching of multiple I/O buffers in transmitting high speed signals over the conductive traces of a given package or board. Such simultaneous switching noise (SSN) manifests in the so-called 'power/ground bounce,' or a fluctuation in the pullup and pulldown reference voltages ideally intended to remain at fixed DC levels.

Where available, the effective saturation currents Isso_pu, Isso_pd would also be characterized in respective tables of instantaneous values measured under controlled IBIS 'laboratory' conditions, with respect to different degrees of supply reference voltage variation—the variation of the power reference VDD in the case of the pullup reference (ΔV_pu), and the variation of the ground reference voltage VGND in the case of the pulldown reference (ΔV_pd). The supply reference voltage variations for the pullup and pulldown references, ΔV_pu, ΔV_pd, may or may not be identical, depending on the power delivery network configuration employed in a particular application.

The voltage provided by each pullup/pulldown VCCS 162, 164 may then be further modulated by computing and applying scaling coefficients Ksso_pu, Ksso_pd based respectively on the appropriate Isso_pu, Isso_pd values obtained from the tables, in accordance with the following equations:

$$Ksso\_pu(\Delta V\_pu)=Isso\_pu(\Delta V\_pu)/Ipu(VDD-Vout)$$

$$Ksso\_pd(\Delta V\_pd)=Isso\_pd(\Delta V\_pd)/Ipd(Vout-VGND)$$

Figure 16B:
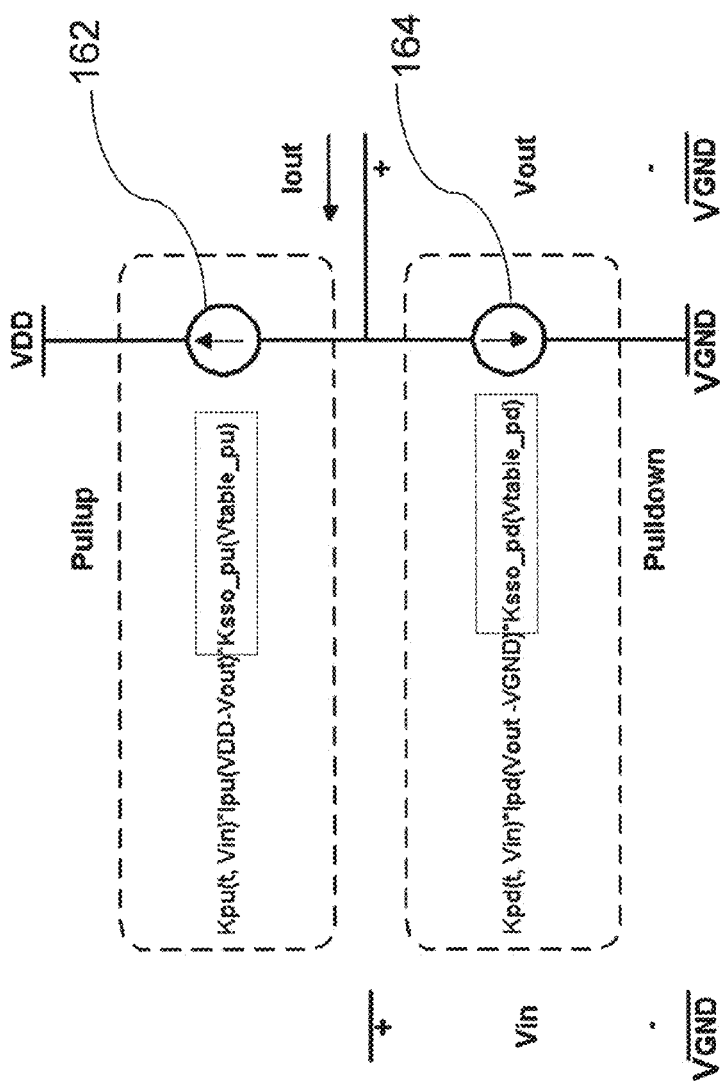

The modulation parameters are thus computed as a function of time and further applied to the transient-modulated currents Ipu, Ipd, as indicated in FIG. 16B.

While this provides suitable correction for SSN power/GND bounce, the effective saturation current tables are not available for most of the existing IBIS models. Again, to somehow 'retro-fit' or re-create the existing models originally characterized for fixed supply reference levels so as to incorporate the corrective tables for Isso_pu, Isso_pd would be prohibitively costly for most applications.

Figure 17:
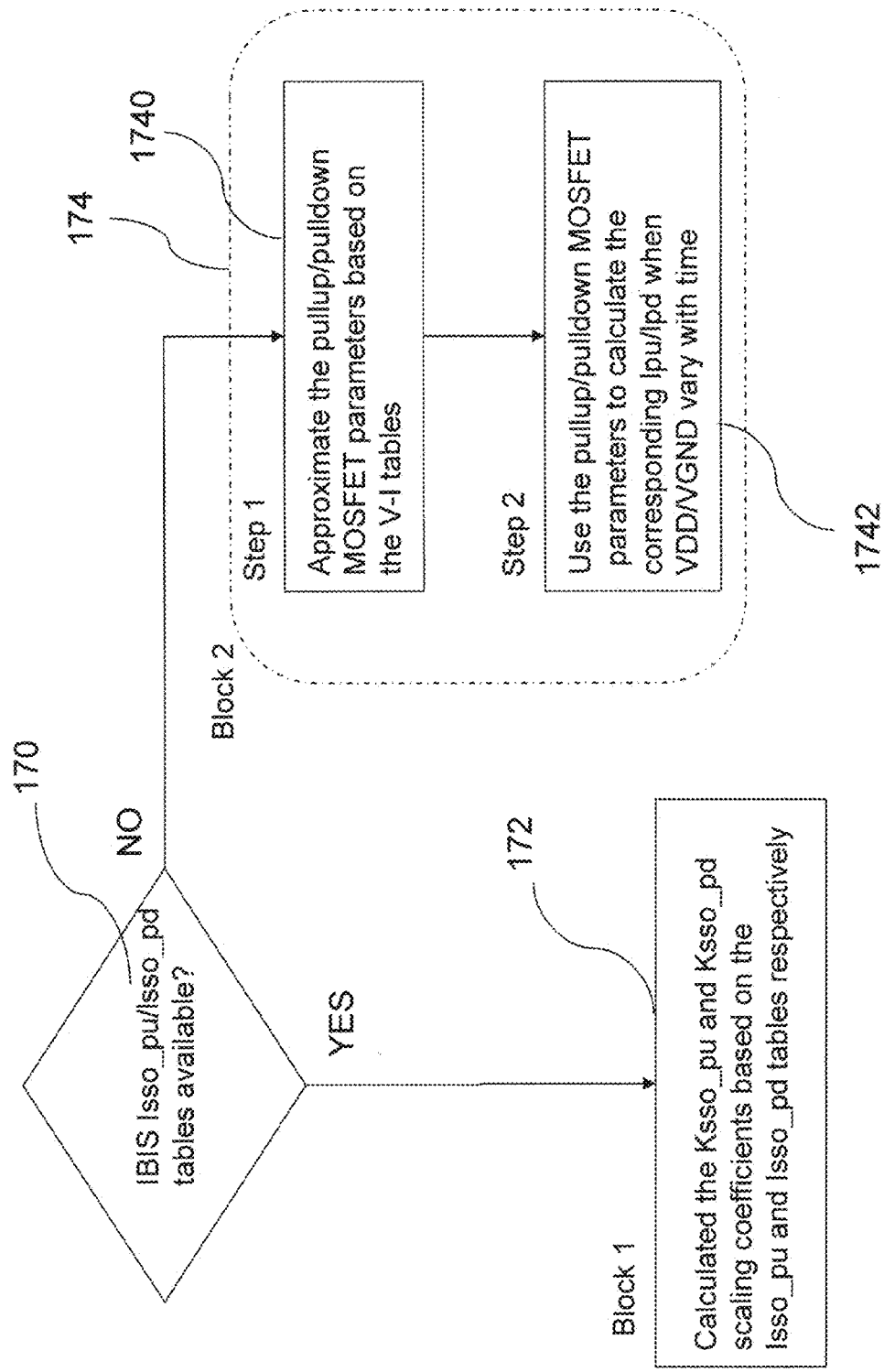
FIG. 17 is a flow diagram illustrating a flow of processes in carried out to scale an IBIS model in an exemplary embodiment according to another aspect of the present invention.

In accordance with an aspect of the present invention, such IBIS buffer models provided without suitable corrective measures like Isso tables are nonetheless scaled to adaptively accommodate the effects of SSN power/GND bounce. Referring to FIG. 17, there is shown a diagram illustrating the general flow of processes for adapting an IBIS buffer model in this regard. Preferably, suitable measures are employed to detect power/ground bounce due to SSN or other such disturbance. At block 170, it is determined whether corrective tables are available for the given IBIS model. If so, the flow proceeds to block 172, where the corrective scaling coefficients Ksso_pu, Ksso_pd are suitably computed based on the available Isso tables, and thereafter applied to Ipu and Ipd, as described in preceding paragraphs.

If, however, corrective measures like the Isso tables are neither provided with the IBIS model nor otherwise available for that particular model, then the flow proceeds to block 174, where the IBIS model is adaptively scaled by deriving the effective currents Ipu and Ipd directly in light of the power/GND bounce ΔV_pu, ΔV_pd. Within block 174, the IBIS model's effective pullup and pulldown MOSFET devices (such as illustrated in the effective circuit of FIG. 15) are reconstructed from known and estimated information. Essentially, surrogate NMOS and PMOS devices consistent with the IBIS model are parametrically reconstructed from a combination of known and estimated information specific to the model. The surrogate devices' parameters are thereby generated at block 1740 based on the I-V and V-t tables provided with the model. The surrogate MOSFET parameters generated at block 1740 are used at block 1742 to adaptively compute the corresponding currents Ipu, Ipd for power/GND bounce effects ΔV_pu, ΔV_pd as a function of time.

Certain factors/conditions are presumed in the illustrated embodiment. First, at block 172, it is presumed that the Isso tables were generated for IBIS modeling applicable to CMOS technology (as opposed to, for example, bipolar or ECL technologies). Second, at block 174, it is presumed that the model's characteristic I-V and V-t tables were likewise generated for IBIS modeling applicable to CMOS technology. While the adaptive scaling approach generally implemented by the embodiments illustrated herein may be applied to modeling based on other device technologies, the derivation of coefficients and device characterizing parameters will differ accordingly to suit a device technology other than the CMOS technology illustrated.

Figure 18:
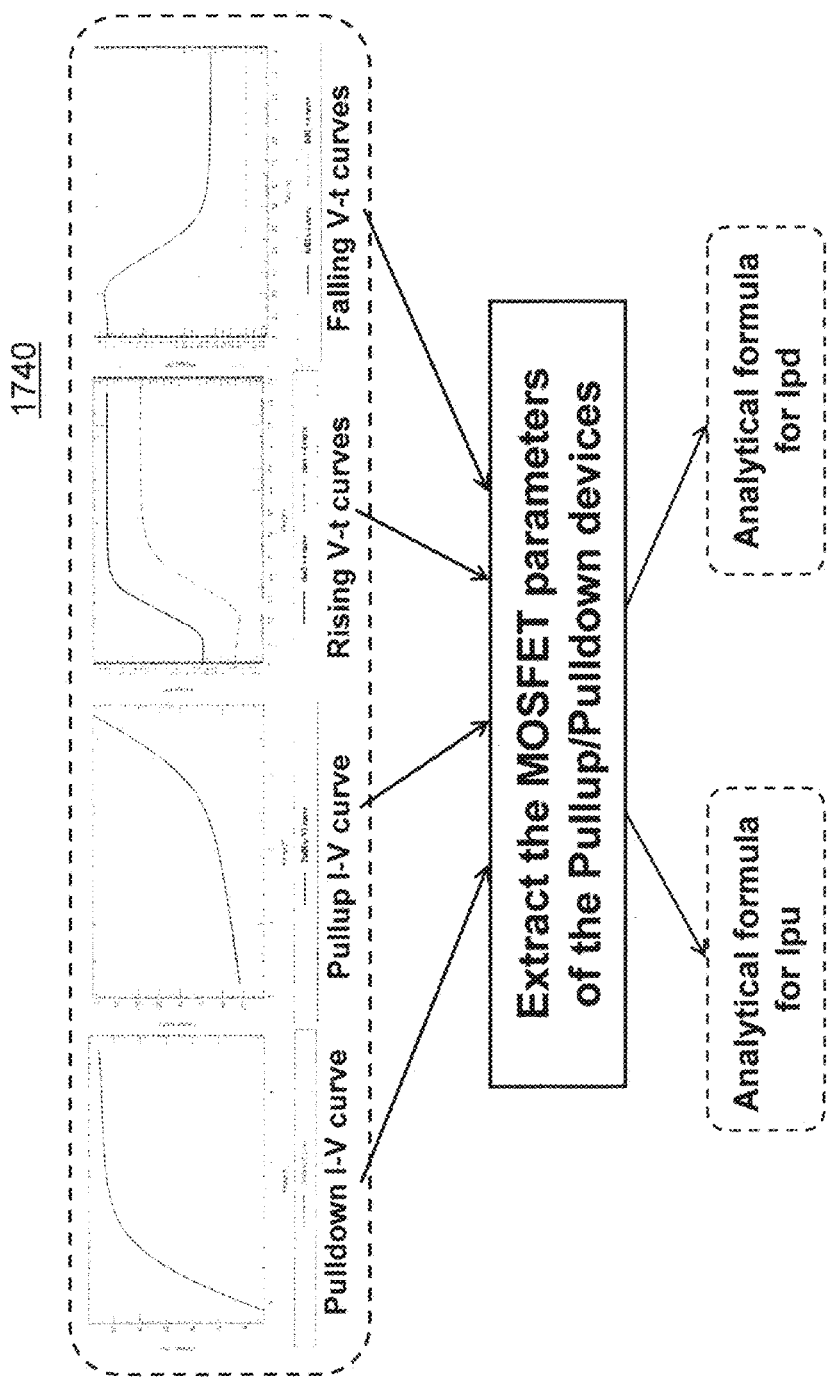
FIG. 18 is a flow diagram illustrating in greater conceptual detail a flow of processes in a portion of the embodiment illustrated in FIG. 17.

FIG. 18 graphically illustrates in greater detail the processes carried out at block 1740. For clearer illustration, the I-V and V-t curves respectively defined by the set of pulldown and pullup I-V tables and the set of rising and falling V-t tables for the IBIS model in the given example are graphically represented. Since the behavior responses of PMOS and NMOS devices represented in the model's effective circuit (FIG. 15) are known, they may be reconstructed in terms of characteristic parameters extracted from information found in the I-V and V-t curves. Thereafter, device-specific equations and parametric relationships may be analyzed at given operating points to formulate the effective drain-source currents IDSP, IDSN seen through the output stage pullup and pulldown devices (such as illustrated in FIG. 15), which translate to the model's instantaneous Ipu and Ipd currents.

Reconstruction of Surrogate NMOS Parameters

Figure 19B:
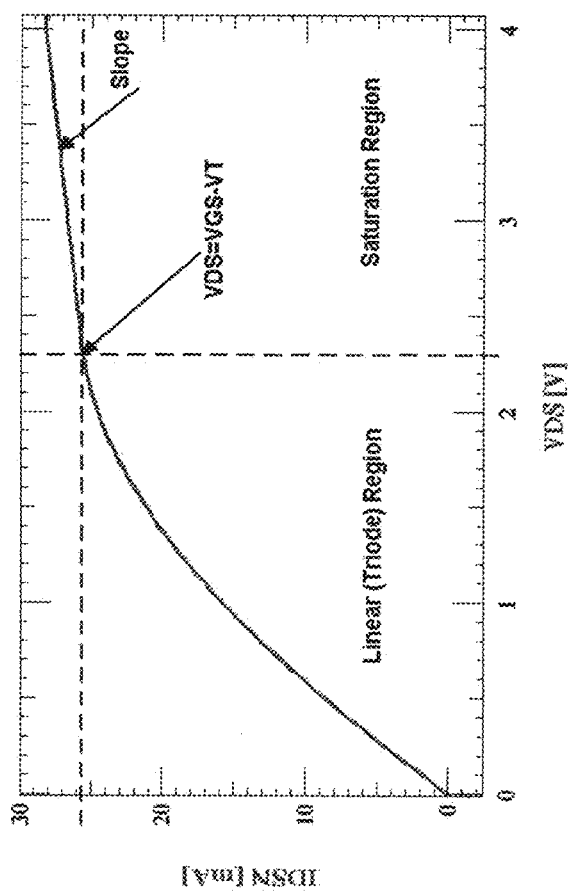
FIG. 19B is a graphic plot illustrating a characteristic waveform for the NMOSFET device of FIG. 19A, indicating the different regions of device operation.
Figure 19A:
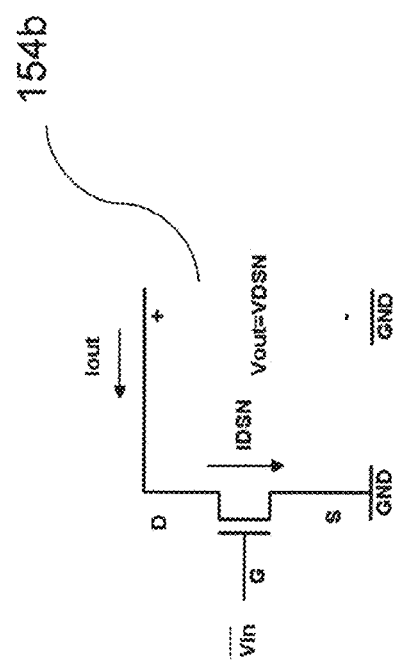
FIG. 19A is a diagram symbolically illustrating the characteristic behavior of an NMOSFET device employed in the effective CMOS circuit of FIG. 15.

The parametric reconstruction of a surrogate NMOS device (used for example in the pulldown devices 154a, 154b in the effective circuit 150 of FIG. 15) in accordance with a preferred embodiment is illustrated with reference to FIGS. 19A-22. FIG. 19A symbolically represents the output stage pulldown NMOS field effect transistor 154b of circuit 150, effectively shown when the pullup PMOS device is turned off—that is, when the input signal Vin transitions from 0 to VDD. The complementary input signal Vin– is applied at the gate G, with the drain-source voltage VDSN established as the output voltage Vout, and the drain-source current IDSN as the output current Iout.

An NMOSFET device of this type is known to operate in three distinct regions: Cutoff, Linear, and Saturation regions. The parametric conditions and relationships describing each region of operation are as indicated below:

1) Cutoff: when $V_{GS,N} \leq V_T$
   such that $I_{DS,N} = 0$
2) Linear: when $V_{GS,N} \geq V_T$ $$\text{such that} \quad I_{DS,N} = K_N\left[(V_{GS} - V_T) - \frac{V_{DS}}{2}\right]V_{DS} * [1 + \lambda V_{DS}] \quad (1)$$

3) Saturation: when $V_{GS,N} \geq V_T$ and $V_{DS,N} > (V_{GS,N} - V_T)$ $$\text{such that} \quad I_{DS,N} = \frac{K_N}{2}(V_{GS} - V_T)^2 * [1 + \lambda V_{DS}] \quad (2)$$

Where:
D represents the device Drain node
G represents the device Gate node
S represents the device Source node
$K_N$ represents the device Gain factor in $A/V^2$
$\lambda$ represents the device Channel-length modulation parameter in $V^{-1}$ $V_T$ represents the device Threshold voltage in V FIG. 19B graphically illustrates a plot of the characteristic IDSN-VDSN curve for the NMOS device 154b, corresponding to the state of operation shown in FIG. 19A (where the NMOS device 154b is on and the PMOS device 152b is off, such that the gate-source voltage VGSN=VDD in this state). The linear and saturation regions are delineated at the operating point defined along the curve where VDSN=VGS–VT.

From these principles of operation for the NMOS device 154b, the effective current IDSN may be determined (applying equations (1) and (2)) for different values of VGSN which would result from fluctuations at supply reference voltage VGND, once the device-specific parameters such as VT, KN, and λ were ascertained. Preferably, these parametric values are estimated based on the given IBIS model's I-V and V-t curves, as illustrated with reference to FIGS. 20-21.

Figure 20:
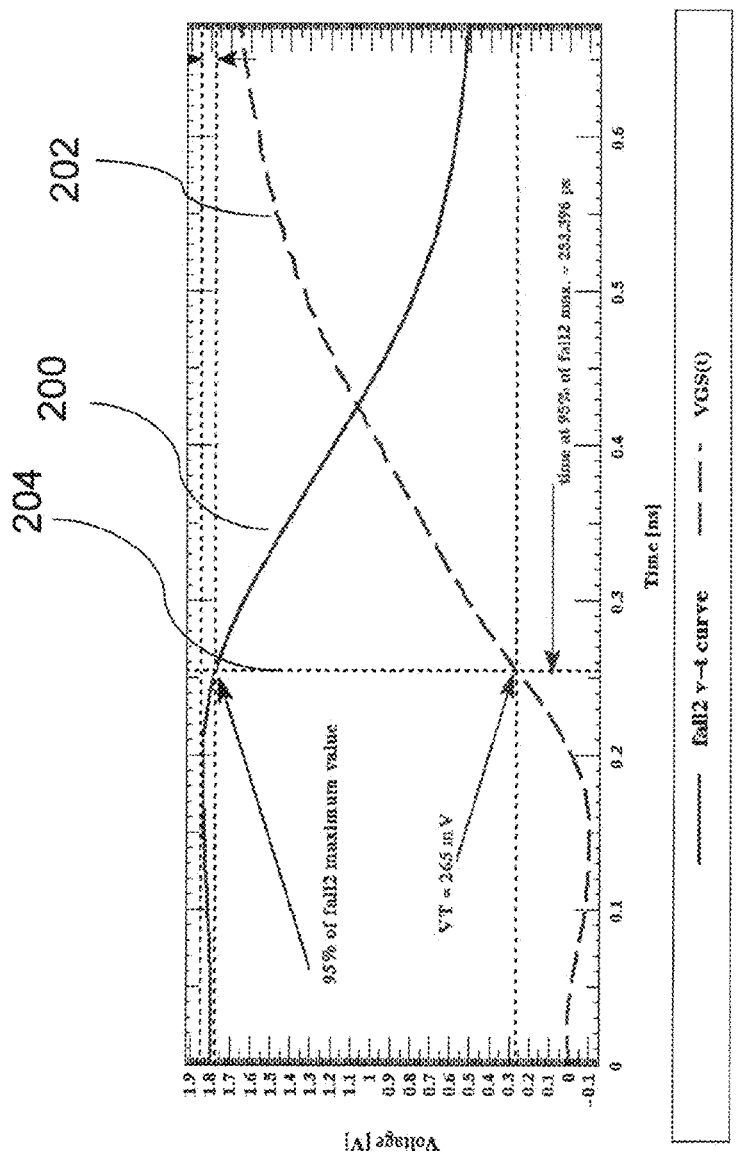
FIG. 20 is a graphic plot of values taken from exemplary falling transition V-t tables provided with a given IBIS model.
Figure 21:
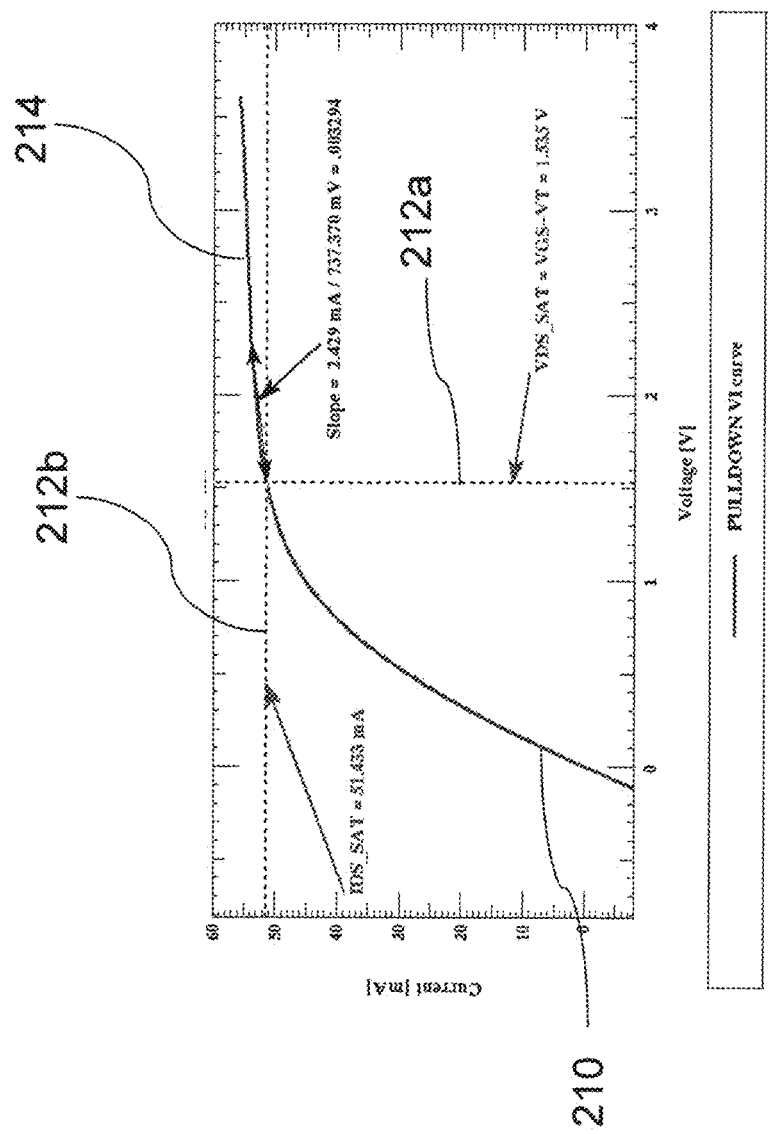
FIG. 21 is a graphic plot of values taken from exemplary pulldown I-V tables provided with a given IBIS model.

Turning to FIG. 20, examples are graphically illustrated of a falling transition V-t curve 200 provided with the IBIS buffer model at hand and a V-t curve 202 derived for VGSN from information available with the IBIS model. The falling transition V-t curve 200 describes the behavior of the model's VOUT in response to a falling transition of VIN, while the VGSN curve 202 describes the corresponding V-t profile of the complementary VIN (which equates to VGSN in FIGS. 15 and 19A). When the output of the overall modeled buffer 150 (FIG. 15) begins to transition from a logic 'High' voltage state to a logic 'Low' voltage state, as indicated by curve 200, its output stage pulldown NMOS transistor device 154b (FIG. 15) starts to turn on. It is recognized that the turn-on switching point for such NMOS transistor device under most conditions will occur when the falling V-t curve 200 for the buffer model drops to approximately 95% of its maximum value. Consequently, the NMOS device's gate-source voltage VGSN indicated by the curve 202 will have exceeded the device threshold voltage VT at the 95% time point 204. In accordance with one aspect of the present invention, then, this time point 204 at which the falling V-t curve 200 reaches 95% of maximum value is correlated to the curve 202 as shown; and, the VGSN value indicated by that curve 202 at such transition time point 204 is taken to be the value of the given NMOS device VT.

It is known in the art that VGSN=VDD*Kpd(t), where Kpd(t) is a coefficient that determines the degree of 'turn-on' and 'turn-off' for the given NMOS pulldown transistor, and VDD is available in the IBIS model's ASCII file. Kpd(t) may be obtained as described in preceding paragraphs from the I-V and V-t curves provided with the IBIS buffer model. The value of VGSN is accordingly derived to generate curve 202.

The device's channel-length modulation parameter λ may be estimated with reference to the I-V curves provided with the IBIS buffer model at hand. An example of the pulldown I-V curve for the modeled buffer is graphically illustrated in FIG. 21. The I-V curve 210 represents the relationship between the pulldown device's drain-source current IDSN and drain-source voltage VDSN, when its gate-source voltage VGSN is equal to the supply power reference voltage VDD. It is recognized that the device channel-length modulation parameter λ approximates to the ratio of the I-V curve 210 Slope to the drain-source current IDSN, while the device is operating in its saturation region (or, I-V Slope-Sat/IDSN-Sat). Since VDSN=VGS–VT for an NMOS transistor device in the saturation region, and since VT may be determined as described in preceding paragraphs (and also since the I-V curve 210 presumes VGSN=VDD), the value of VDSN 212a at which the device enters the saturation region 214 may be determined. The corresponding IDSN-Sat 212b may be directly read from the I-V curve. Once the I-V curve's Slope- Sat is calculated from values read off the curve at region 214, λ may be determined as follows:

$$\lambda = \text{Slope-}Sat/IDSN\text{-}Sat$$

The remaining unknown parameter KN value may now be determined by inserting the newly-determined parameter values into NMOS device's characteristic equation (2), using a suitable operating point—conveniently, the saturation point in the present example. As KN remains the only unknown value at this operating point (since IDSN equates to the determined IDSN-Sat value), the equation for IDSN may be solved to yield the KN value. Thereafter, this and the other device-specific parameter values obtained may be used to directly compute the IDSN for any value of VDSN, VGSN—even as those values are affected by power/GND bounce or any other fluctuation in supply reference levels.

Figure 22:
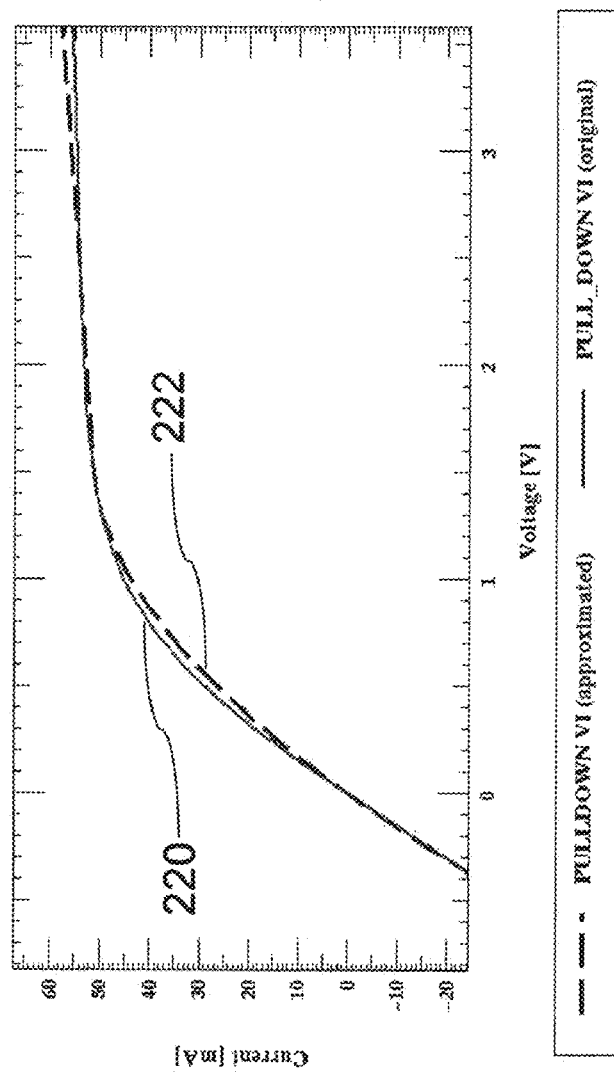
FIG. 22 is a graphic plot of comparative waveforms validating the accuracy of reconstructed surrogate device parameters in accordance with the embodiment of FIG. 17.

This parametric reconstruction is validated as shown in FIG. 22, where the waveform 220 shows the current IDSN values as read from the given IBIS model's I-V tables. As shown, the waveform 222 obtained by directly computing IDSN values from the reconstructed parameter values closely tracks the original waveform 220.

Reconstruction of Surrogate PMOS Parameters

Figure 23B:
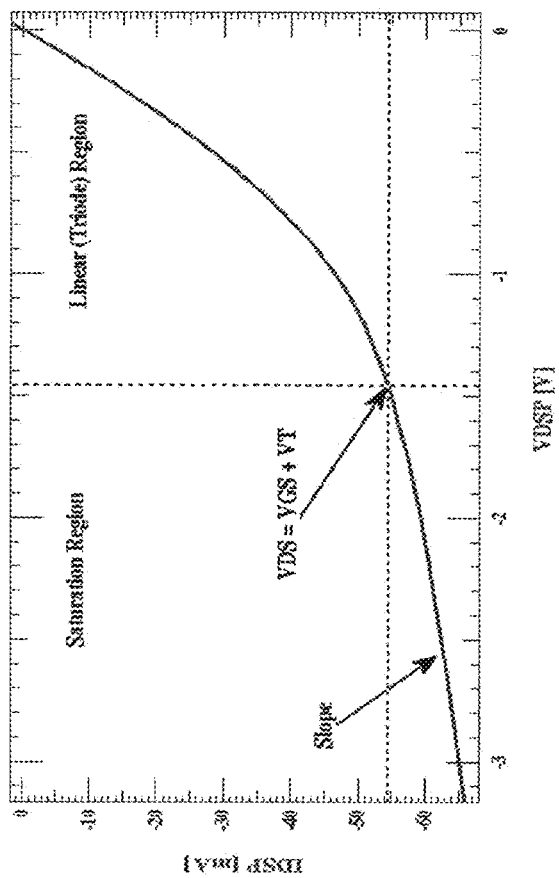
FIG. 23B is a graphic plot illustrating a characteristic waveform for the PMOSFET device of FIG. 23A, indicating the different regions of device operation.
Figure 23A:
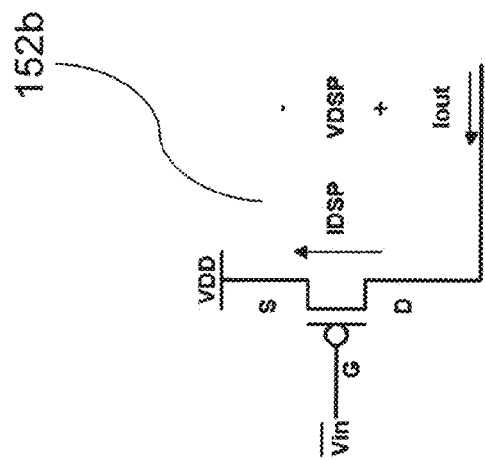
FIG. 23A is a diagram symbolically illustrating the characteristic behavior of an PMOSFET device employed in the effective CMOS circuit of FIG. 15.

The parametric reconstruction of a surrogate PMOS device (such as used in the pullup devices 152a, 152b in the effective circuit 150 of FIG. 15) largely mirrors that for an NMOS device as described in preceding paragraphs. The process in accordance with a preferred embodiment is illustrated with reference to FIGS. 23A-25. FIG. 23A symbolically represents the output stage pullup PMOS field effect transistor 152b of circuit 150, effectively shown when the pulldown NMOS device is turned off—that is, when the input signal Vin transitions from VDD to 0. The complementary input signal Vin− is applied at the gate G, with the drain-source voltage VDSP established as the output voltage Vout, and the drain-source current IDSP as the output current Tout.

A PMOSFET device of this type is known to operate in three distinct regions: Cutoff, Linear, and Saturation regions. The parametric conditions and relationships describing each region of operation are as indicated below:

1) Cutoff: when $|V_{GS,P}| \leq |V_T|$
   such that $I_{DS,P} = 0$
2) Linear: when $|V_{GS,P}| \geq |V_T|$ and $|V_{DS,P}| \leq (|V_{GS,P}| - |V_T|)$ such that $$I_{DS,P} = -K_P\left[(|V_{GS}| - |V_T|) - \frac{|V_{DS}|}{2}\right]|V_{DS}| * [1 + \lambda|V_{DS}|] \quad (3)$$

3) Saturation: when $|V_{GS,P}| \geq |V_T|$ and $|V_{DS,P}| > (|VGS,P| - |VT|)$ such that $I_{DS,P} = -\frac{K_P}{2}(|V_{GS}| - |V_T|)^2 * [1 + \lambda|V_{DS}|] \quad (4)$ Where:
D represents the device Drain node
G represents the device Gate node
S represents the device Source node
$K_P$ represents the device Gain factor in A/V$^2$
λ represents the device Channel-length modulation parameter in V$^{-1}$
$V_T$ represents the device Threshold voltage in V FIG. 23B graphically illustrates a plot of the characteristic IDSP-VDSP curve for the PMOS device 152b, corresponding to the state of operation shown in FIG. 23A (where the PMOS device 152b is on and the NMOS device 154b is off, such that the gate-source voltage VGSP=−VDD in this state). The linear and saturation regions are delineated at the operating point defined along the curve where VDSP=VGS+VT.

From these principles of operation for the PMOS device 152b, the effective current IDSP may be determined (applying equations (3) and (4)) for different values of VGSP which would result from fluctuations at supply reference voltage VDD, once the device-specific parameters such as VT, KP, and λ were ascertained. Preferably, these parametric values are estimated based on the given IBIS model's I-V and V-t curves, as illustrated with reference to FIGS. 24-25.

Figure 24:
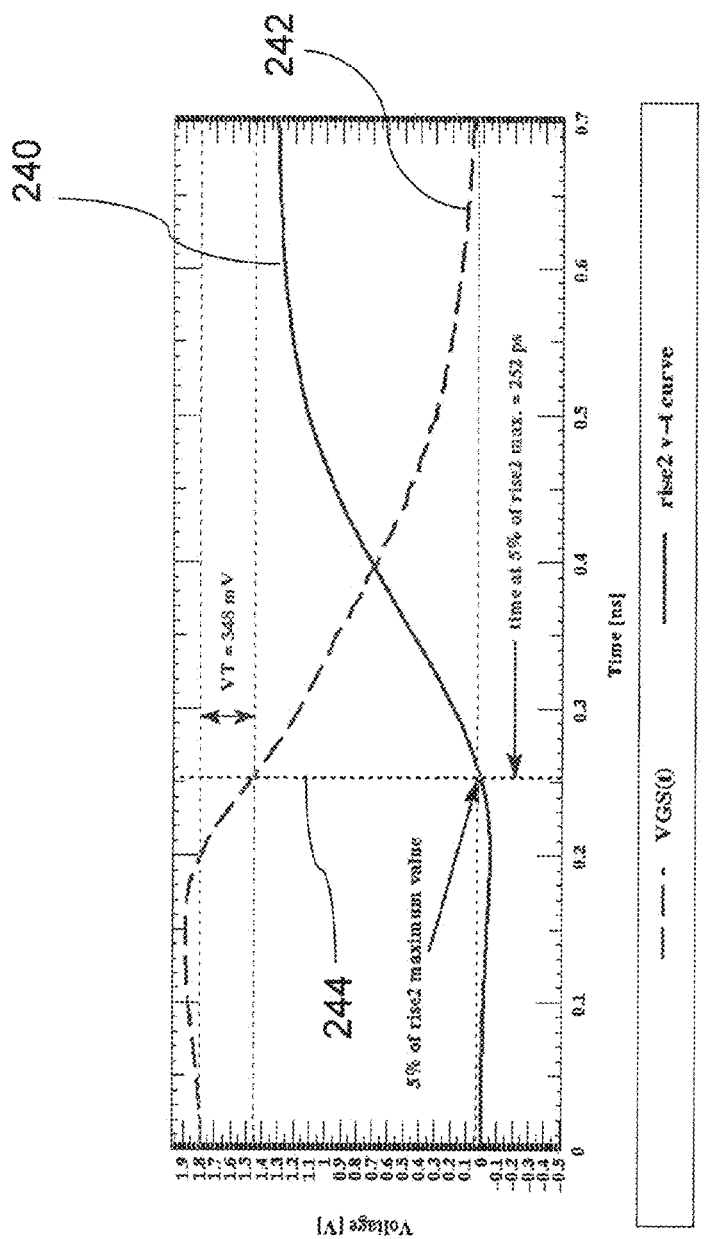
FIG. 24 is a graphic plot of values taken from exemplary rising transition V-t tables provided with a given IBIS model.
Figure 25:
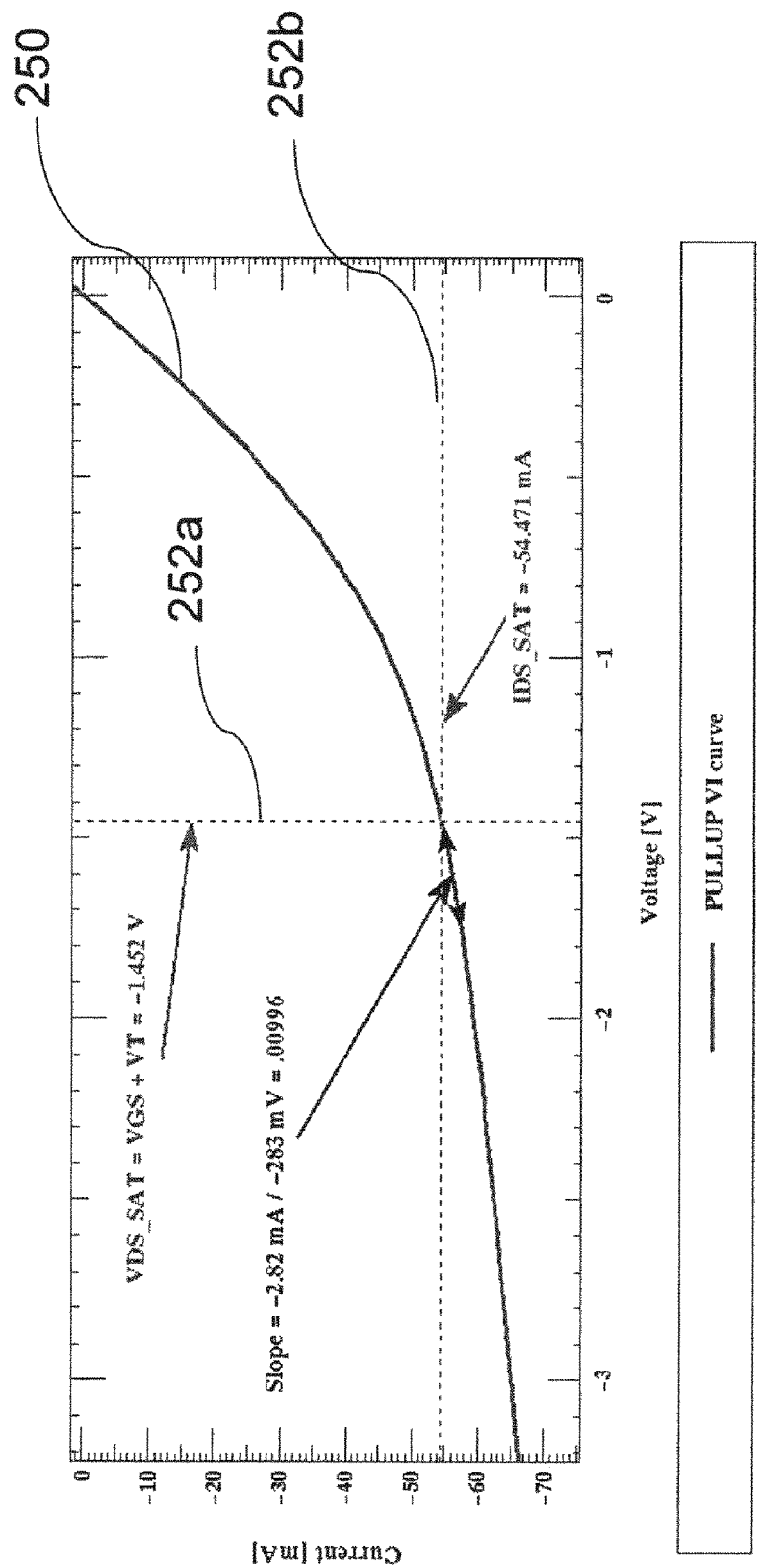
FIG. 25 is a graphic plot of values taken from exemplary pullup I-V tables provided with a given IBIS model.

Turning to FIG. 24, examples are graphically illustrated of a rising transition V-t curve 240 provided with the IBIS buffer model at hand, and a V-t curve 242 derived for VGSP from information available with the IBIS model. The rising transition V-t curve 240 describes the behavior of the model's VOUT in response to a rising transition of VIN, while the VGSP curve 242 describes the corresponding V-t profile of the complementary VIN (which equates to VGSP in FIGS. 15 and 23A). When the output of the overall modeled buffer 150 (FIG. 15) begins to transition from a logic 'Low' voltage state to a logic 'High' voltage state, as indicated by curve 240, its output stage pullup PMOS transistor device 152b (FIG. 15) starts to turn on. It is recognized that the turn-on switching point for such PMOS transistor device under most conditions will occur when the rising V-t curve 240 for the buffer model rises to approximately 5% of its maximum value. Consequently, the PMOS device's gate-source voltage VGSP indicated by the curve 242 will have exceeded the device threshold voltage VT at the 5% time point 244. In accordance with one aspect of the present invention, then, this time point 244 at which the rising V-t curve 240 reaches 5% of maximum value is correlated to the curve 242 as shown; and, the VGSP value indicated by that curve 242 at such transition time point 244 is taken to be the value of the given PMOS device VT.

It is known in the art that VGSP=VDD−VDD*Kpu(t), where Kpu(t) is a coefficient that determines the degree of 'turn-on' and 'turn-off' for the given PMOS pullup transistor, and VDD is available in the IBIS model's ASCII file. Kpu(t) may be obtained as described in preceding paragraphs from the I-V and V-t curves provided with the IBIS buffer model. The value of VGSP is accordingly derived to generate curve 242.

The device's channel-length modulation parameter λ may be estimated with reference to the I-V curves provided with the IBIS buffer model at hand. An example of the pullup I-V curve for the modeled buffer is graphically illustrated in FIG. 25. The I-V curve 250 represents the relationship between the pullup device's drain-source current IDSP and drain-source voltage VDSP, when its gate-source voltage VGSP is equal to the inverse of the supply power reference voltage, or −VDD. It is recognized that the device channel-length modulation parameter λ approximates to the ratio of the I-V curve 250 Slope to the drain-source current IDSP, while the device is operating in its saturation region (or, I-V Slope-Sat/IDSP-Sat). Since VDSP=VGS+VT for a PMOS transistor device in the saturation region, and since VT may be determined as described in preceding paragraphs (and also since the I-V curve 250 presumes VGSP=−VDD), the value of VDSP 252a at which the device enters the saturation region may be determined. The corresponding IDSP- at 252b may be directly read from the I-V curve. Once the I-V curve's Slope-Sat is calculated from values read off the curve at region 254, λ may be determined as follows:

$$\lambda = \text{Slope-}Sat/IDSP\text{-}Sat$$

The remaining unknown parameter KP value may now be determined by inserting the newly-determined parameter values into PMOS device's characteristic equation (4), using a suitable operating point—conveniently, the saturation point in the present example. As KP remains the only unknown value at this operating point (since IDSP equates to the determined IDSP-Sat value), the equation for IDSP may be solved to yield the KP value. Thereafter, this and the other device-specific parameter values obtained may be used to directly compute the current IDSP for any value of VDSP, VGSP—even as those values are affected by power/GND bounce or any other fluctuation in supply reference levels.

The surrogate pullup and pulldown devices reconstructed as described in preceding paragraphs enable the accurate simulation of the electronic system in question (or certain portions thereof), while largely preserving the processing efficiencies gained by use of IBIS modeling level analyses. Where the necessary correction measures (such as the corrective modulation coefficients Ksso_pu and Ksso_pd) are not readily available, the reconstructed parameter values may be used in the devices' characteristic equations (1)-(4) to solve for the respective drain-source currents IDSN and IDSP.

Figure 26:
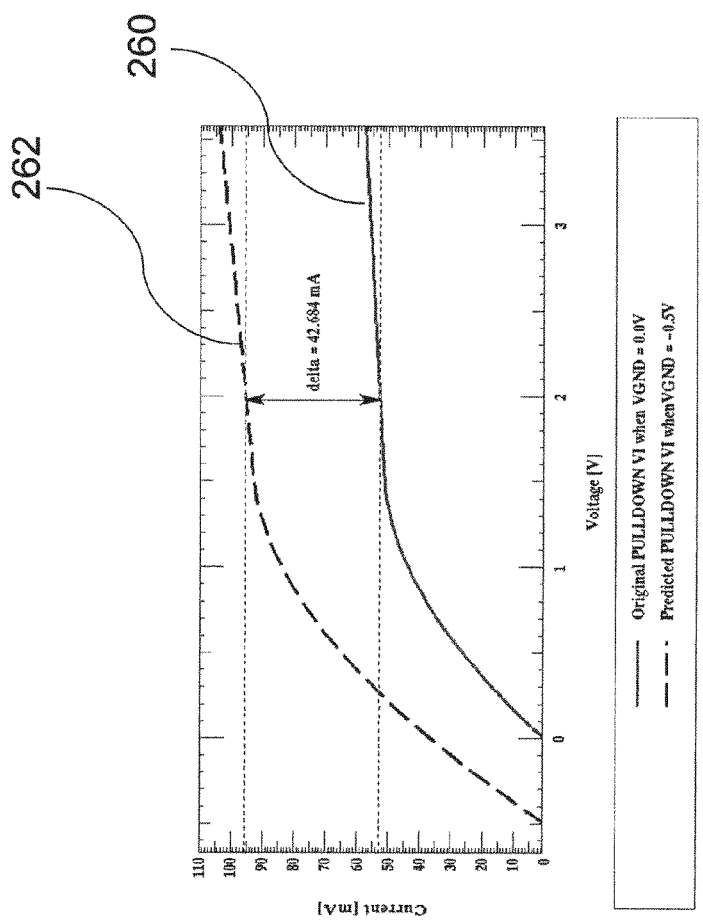
FIG. 26 is a graphic plot of a channel current waveform for an NMOS pulldown device generated based on surrogate device parameters reconstructed in accordance with the embodiment of FIG. 17, with a non-zero VGND fluctuation, as compared to the original current waveform with VGND fixed at 0.0 V.

FIG. 26 illustrates for the pulldown case comparative graphic plots for a drain-source current (IDSN) across the pulldown device's channel when its reference voltage level VGND at ground is at the ideal fixed level 0.0V (curve 260), and where the level VGND fluctuates to a −0.5V level (curve 262). In the first case, since the I-V and V-t tables of the given IBIS buffer model are premised on VGND remaining fixed at its ideal level, the IDSN value for a particular operating point may be looked up in the appropriate IBIS model's tables. In the second case, the IDSN value is directly calculated from parametric reconstruction of a surrogate NMOS device. The comparative curves 260, 262 illustrate the significant impact that a −0.5V fluctuation in the ground level VGND may have on the drain-source current of the device. For the illustrated example, the reference voltage fluctuation translates to a 42.684 mA shift in the drain-source current level, which simulation analysis would fail to account for without responsive scaling of the IBIS model(s) employed, as disclosed herein.

Figure 27A:
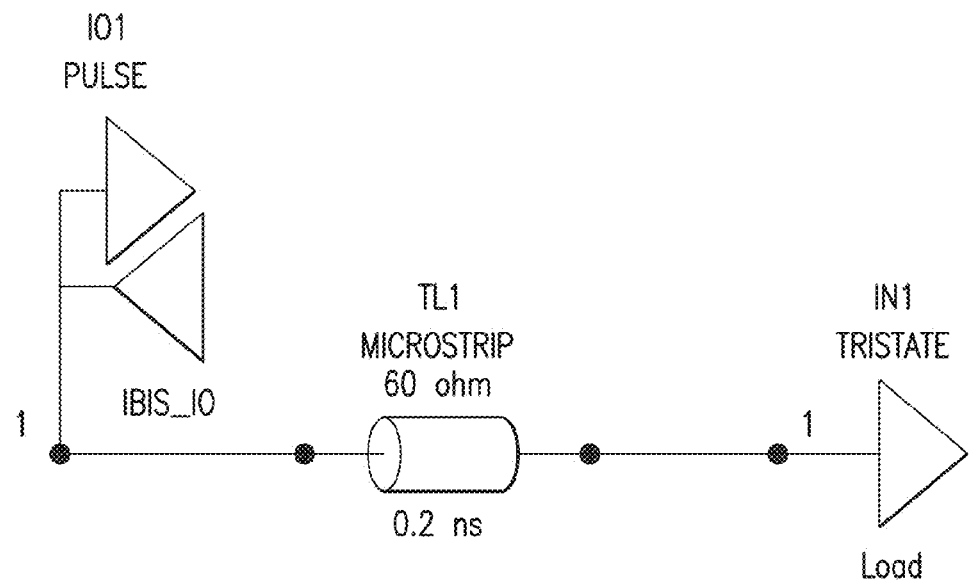
FIG. 27A is a schematic diagram illustrating an experimental circuit topology used to verify the corrective and adaptive scaling of an IBIS model according to the embodiment of FIG. 17.
Figure 27B:
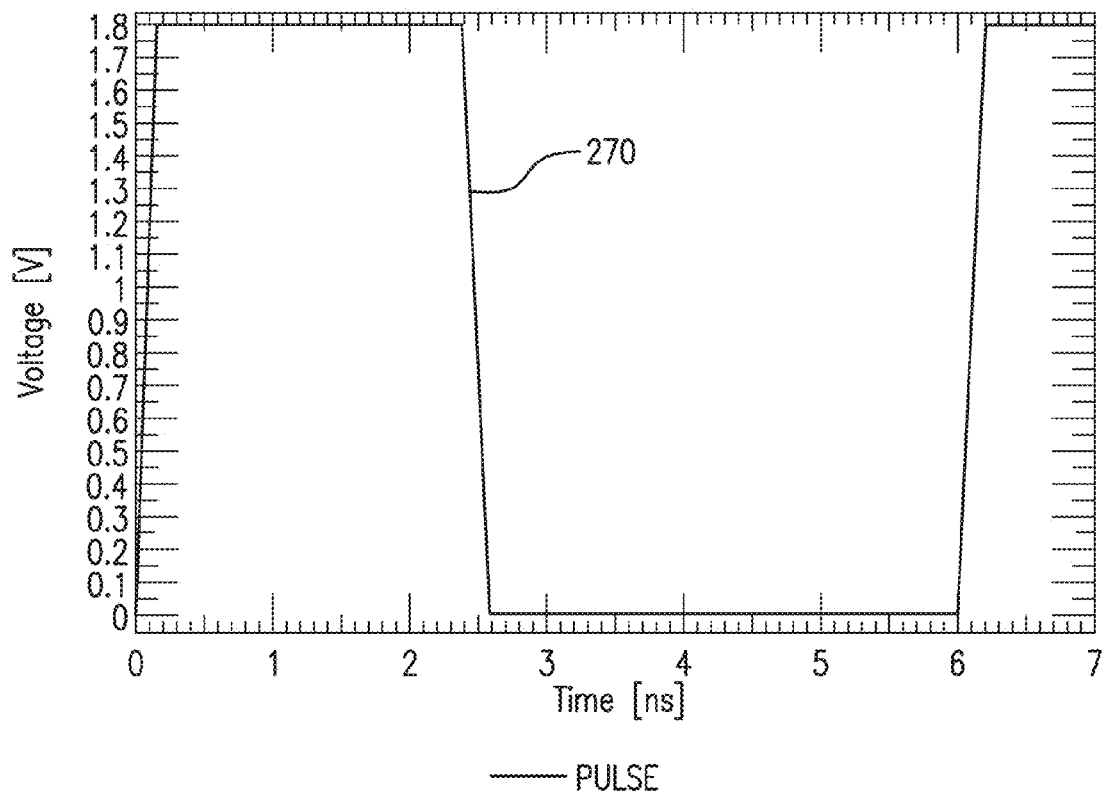
FIG. 27B is a graphic plot of an input pulse applied for experimental purposes to the circuit topology of FIG. 27A.

The effectiveness of the subject method and system for adaptively scaling an IBIS model has been demonstrated using various experimental circuit system configurations. The topology for one such experimental circuit configuration is schematically illustrated in FIG. 27A, where an IBIS I/O buffer model IO1 is coupled to an input load model IN1 by a microstrip transmission line model TL1. A input pulse 270 illustrated in FIG. 27B, having 0.2 nanosecond rise and fall times, and a 6 nanosecond duration, is applied to the experimental setup by suitable simulation. The simulation results for the voltage switching waveform of the IBIS model IO1 are illustrated in FIGS. 28A-28B for the case where pre-established Isso_pu and Isso_pd corrective scaling tables are available with the IBIS model, and in FIGS. 29A-29B for the case where such corrective scaling tables are not available with the model.

Figure 28B:
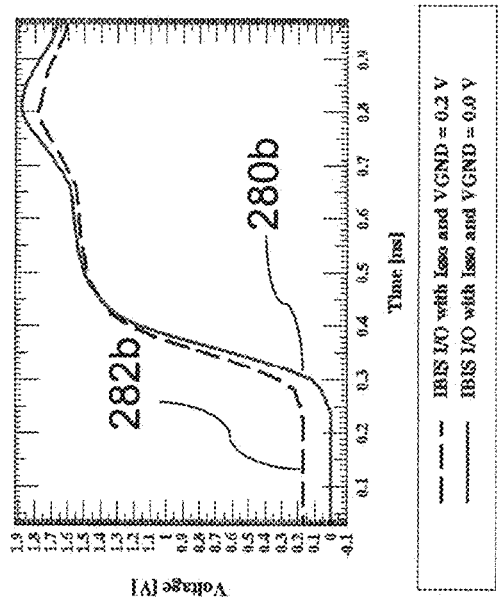
FIG. 28A-28B are graphic plots of comparative switching waveforms seen at a load portion of the circuit topology of FIG. 27A, for the original case with a VGND level fixed at 0.0 V and for the correctively scaled case with the VGND bounced to 0.2V.
Figure 28A:
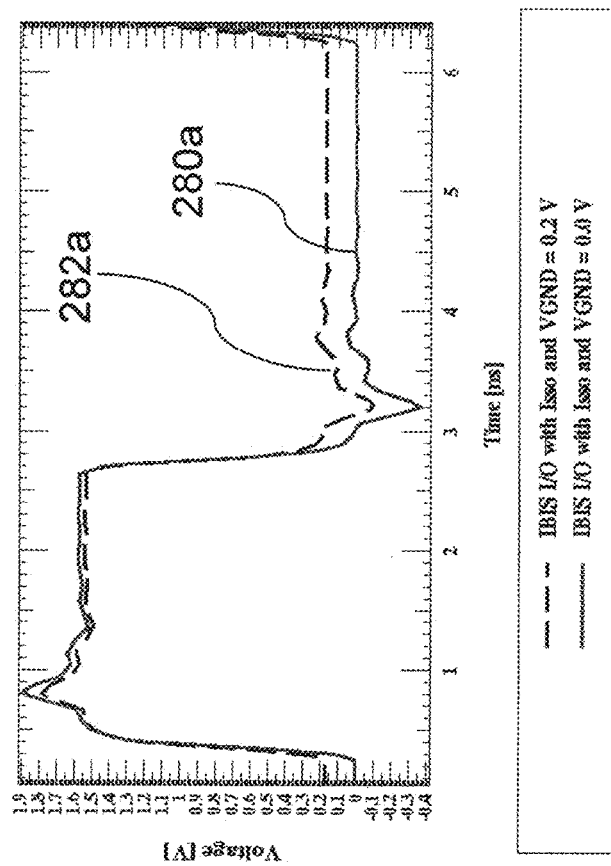

The switching waveform results illustrated in FIGS. 28A-28B thus correspond to block 172 in the flow diagram of FIG. 17, where the corrective scaling coefficients Ksso-pu and Ksso_pd may be obtained from the Isso_pu and Isso_pd tables' data and applied to the instantaneous drain-source currents of the model's effective pullup and pulldown devices. FIG. 28A comparatively shows a curve 280*a* representing the simulated switching waveform at the load IN1 when VGND is held steady at its fixed 0.0V level (VDD held at its fixed non-zero level), along with a curve 282*a* representing the simulated switching waveform when VGND is set to a different 0.2 V level (VDD held at its fixed non-zero level), but with the available Isso corrective scaling applied. FIG. 28B shows portions 280*b*, 282*b* of the curves 280*a*, 282*a* in greater detail on an expanded time scale. The broader view offered by curves 280*a*, 282*a* reveal the effects of ground bounce on steady state value of the switching waveform, while the expanded view offered by curve portions 280*b*, 282*b* reveal the effects thereof on the switching delay. The corrective scaling, where available, accounts for these and other such SSN effects.

Figure 29B:
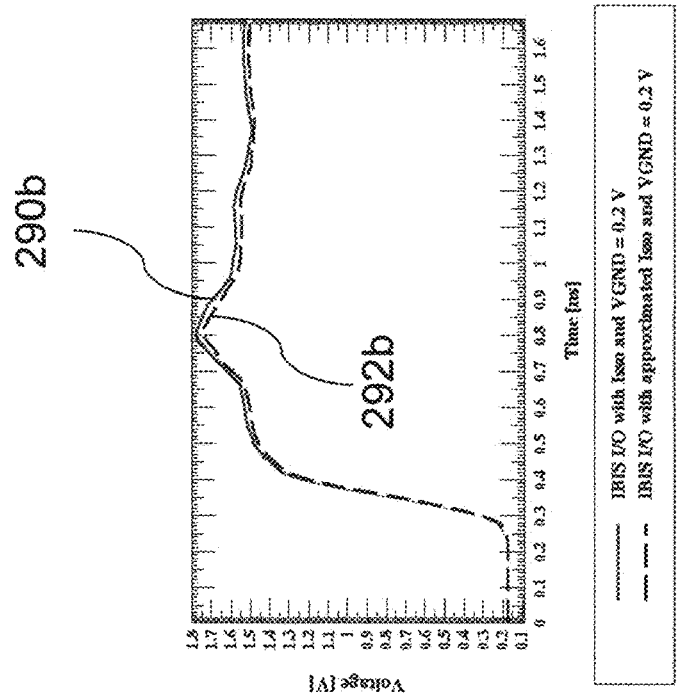
FIG. 29A-29B are graphic plots of comparative switching waveforms seen at the load portion of the circuit topology of FIG. 27A, with the VGND bounced to 0.2V, for the correctively scaled case and for the adaptively scaled case.
Figure 29A:
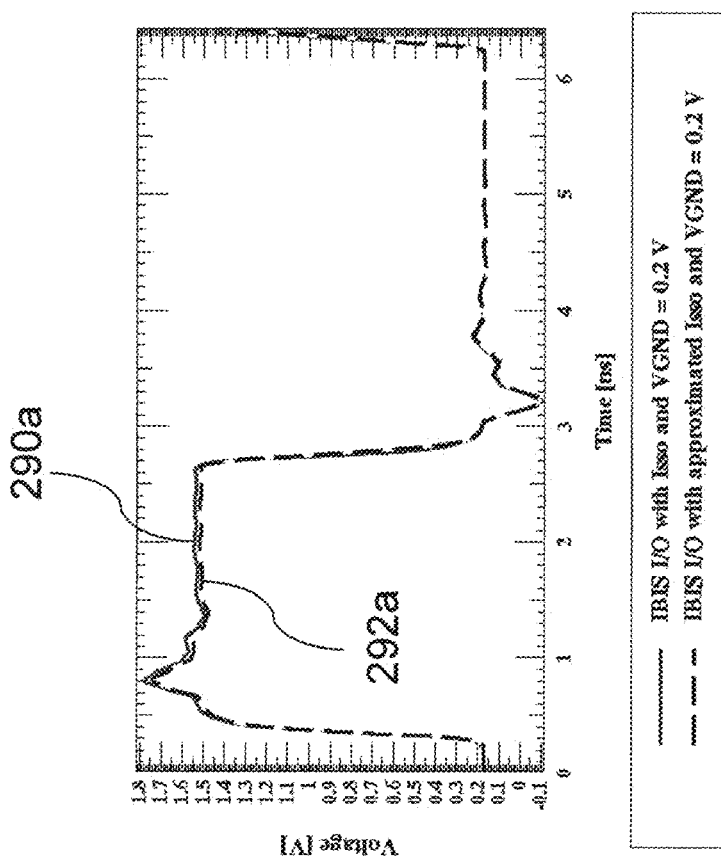

The switching waveform results illustrated in FIGS. 29A-29B correspond in part to block 174 of the flow diagram of FIG. 17, where the Isso corrective scaling tables are not available, and the surrogate pullup and pulldown devices must be parametrically reconstructed in order to compute the model's instantaneous pullup and pulldown drain-source currents when subjected to SSN. In FIG. 29A, curve 290*a* corresponds to the curve 282*a* of FIG. 28A, where the available Isso table data is applied to correctively scale the IBIS model when VGND has fluctuated to a non-zero 0.2 V level (VDD held at its fixed non-zero level). Curve 292*a* represents the simulated switching waveform under the same conditions, but with the model's effective drain-source currents determined based on the reconstructed surrogate pullup and pulldown parameters. FIG. 29B shows portions 290*b*, 292*b* of the curves 290*a*, 292*a* but in greater detail on an expanded time scale. The close correlation and alignment of the curves 290*a*, 292*a* and 290*b*, 292*b* demonstrate the effectiveness of the surrogate device reconstruction approach carried out in accordance with the present invention. Even without the benefit of pre-established Isso corrective scaling tables obtained under precise laboratory conditions, comparable scaling is adaptively applied by the disclosed method and system to ensure accurate utilization of the given IBIS model(s) where subjected to power/ground bounce or other SSN effects.

Referring back to FIG. 10, a system level flow for selective application of IBIS model scaling during SI/PI analysis occurs as follows in accordance with one exemplary embodiment. A user selects the desired scaling method for each IO buffer in the given topology through a suitable user interface unit 102, preferably using the command menus provided in the SI/PI tool being utilized. The user interface unit 102 passes the selected scaling method(s) to the SI/PI topology editor controller unit 100. Controller unit 100 then operates to trigger the graphic display of appropriate IO buffer symbol(s) on a topology canvas corresponding to the selected scaling method(s), and passes the scaling method(s) to the transient simulation unit 106*c*. Transient simulation is launched to perform SI/SSN analysis based on the selected scaling method(s), using the selected scaling method(s) to model/simulate each IO buffer model during circuit simulation.

Figure 30:
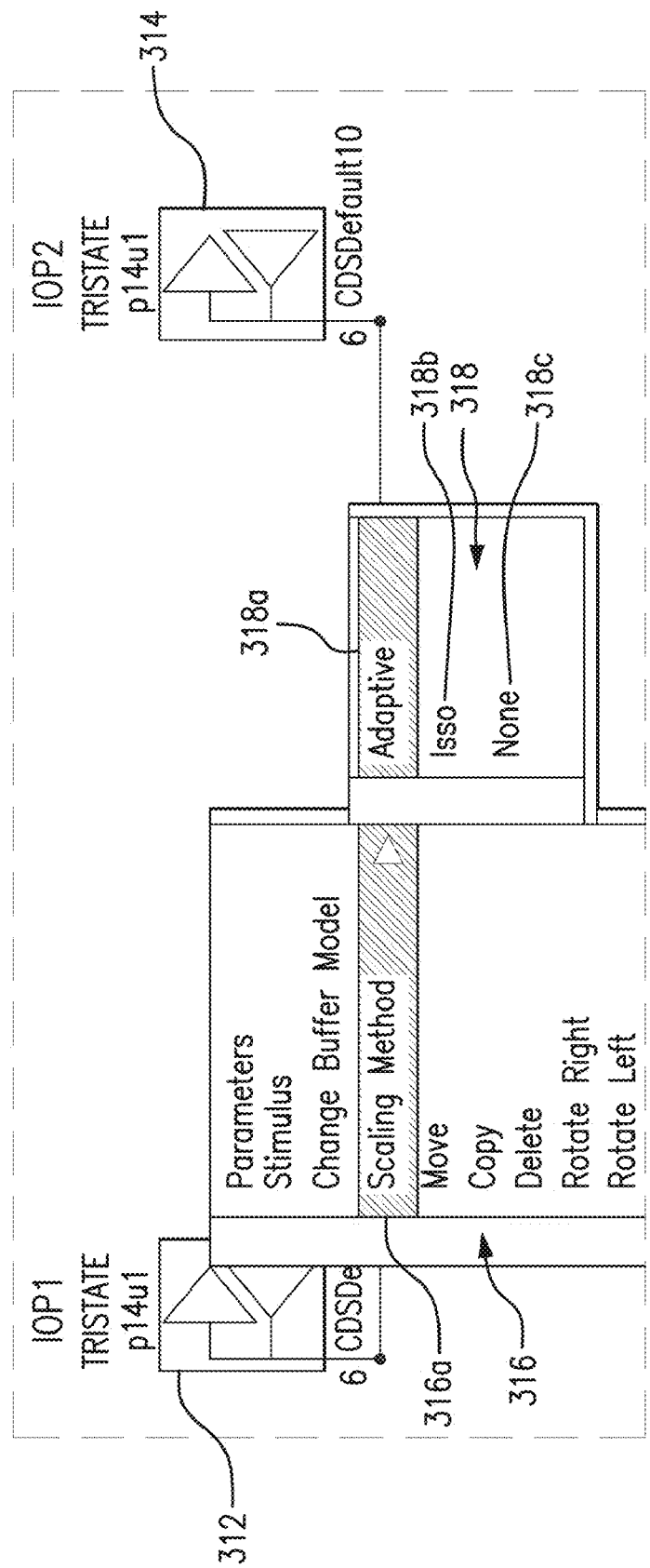
FIG. 30 is an illustrative representation of a graphic user interface generated during system operation in an exemplary embodiment of the present invention, showing the display of scaling method selection windows for a behavioral buffer model included in an illustrative topology.

FIG. 30A illustrates one example of a display screen that may be generated by user interface unit 100 during the course of system operation. Selecting (for example, by pointing a cursor to and clicking a pointing device button) one of the IO buffer symbols 312, 314 (such as the symbol labeled "IOP1" on the display screen) in a given topology opens a menu window 316 displaying a set of commands/settings applicable to the selected IO buffer. The "Scaling Method" command 316*a* is preferably included in menu 316 to allow the user's selection of the desired scaling method for use by the transient simulator. Selection of this command preferably opens a submenu window 318, from which the desired scaling method may be specified.

Such selection may be made for each of the IO buffer models 312, 314 in the topology, and is preferably carried out as follows (with reference to FIG. 17). If the "Adaptive" scaling method option 318a is selected (preferably set as the default option), a check is made for the availability of Isso_pu/Isso_pd tables for the buffer model in question. If so, the operation indicated at block 172 of FIG. 17 is executed to scale using such tables. Otherwise, the adaptive scaling operation is executed upon the buffer model as indicated at block 174 of FIG. 17.

If the "Isso" scaling method option 318b is selected in submenu window 318, and the Isso_pu/Isso_pd tables are in fact available for the buffer model in question, the operation indicated at block 172 of FIG. 17 is executed to scale the buffer model using such tables. Otherwise, no scaling is carried out, and the buffer model is used as is (this gives the user the option to bypass block 174 of FIG. 17, if desired).

If the "None" option 318c is selected in submenu window 318, no scaling is applied to the buffer model. This speeds up the simulation as it altogether bypasses the computations required for scaling. Simulation is then performed with VCC and GND held at fixed levels which do not vary with time.

Figure 31:
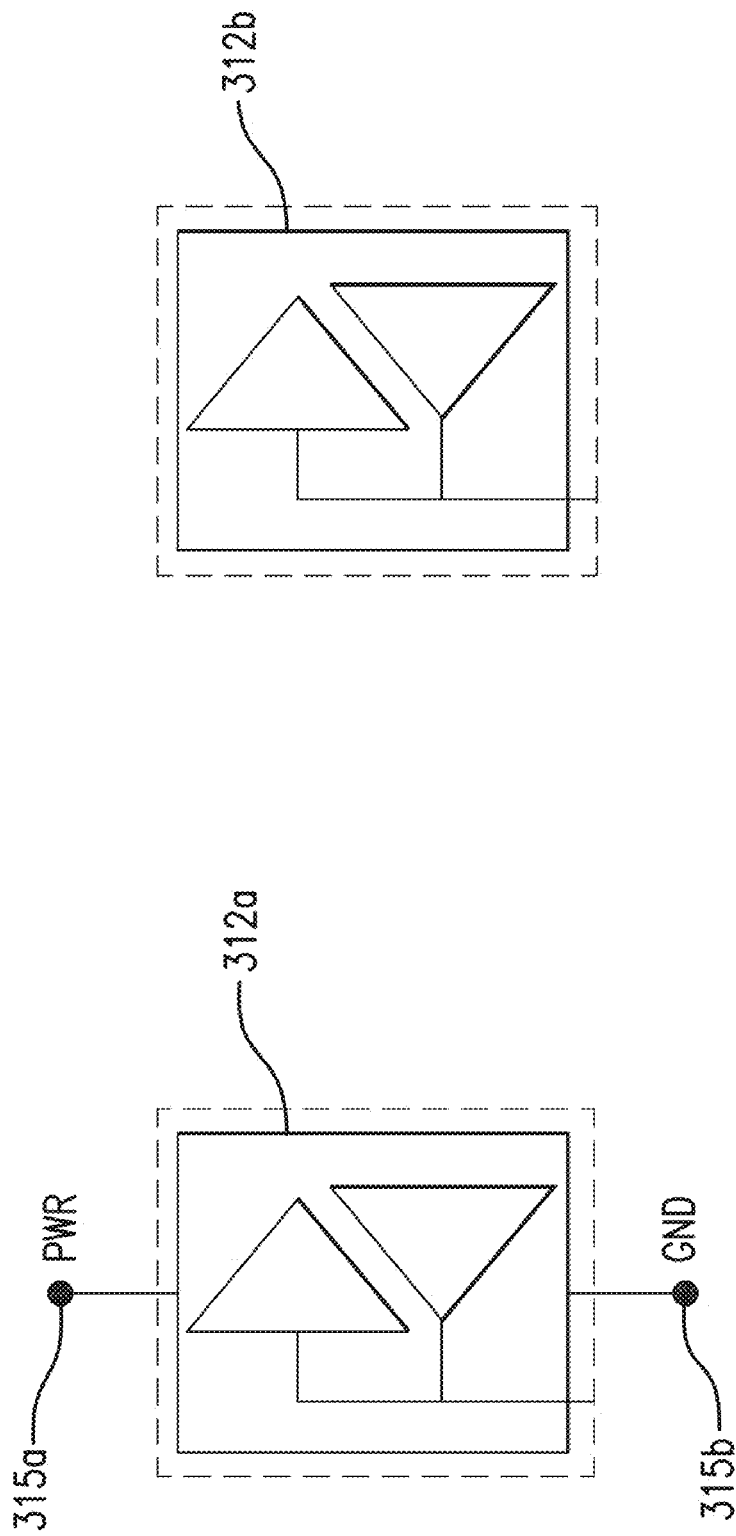
FIG. 31 is an illustrative representation of graphic symbology for a buffer model alternatively applied by a graphic user interface to a buffer model according to the scaling method selection shown in FIG. 30; and, FIG. 32 is a block diagram illustrating an exemplary interconnection of units in a processor-based system for implementing the embodiments of methods and systems according to various aspects of the present invention.

Turning to FIG. 31, when the "Adaptive" or "Isso" scaling method options 318a, 318b is selected for a given buffer model, the user interface unit 102 preferably displays graphic PWR and GND terminals 315a, 315b emerging from buffer model's symbol 312a. This aids the user in selectively manipulating the buffer model symbol 312a on screen to connect the buffer model as desired to corresponding terminals of the appropriate PDN. When no scaling is desired (i.e., the "None" option 318c is selected), no PWR or GND terminals are shown on the IO buffer model's symbol 312b. The system automatically sets the terminals to the corresponding voltage sources in the background (the values of the sources being specified in the IBIS file).

Figure 32:
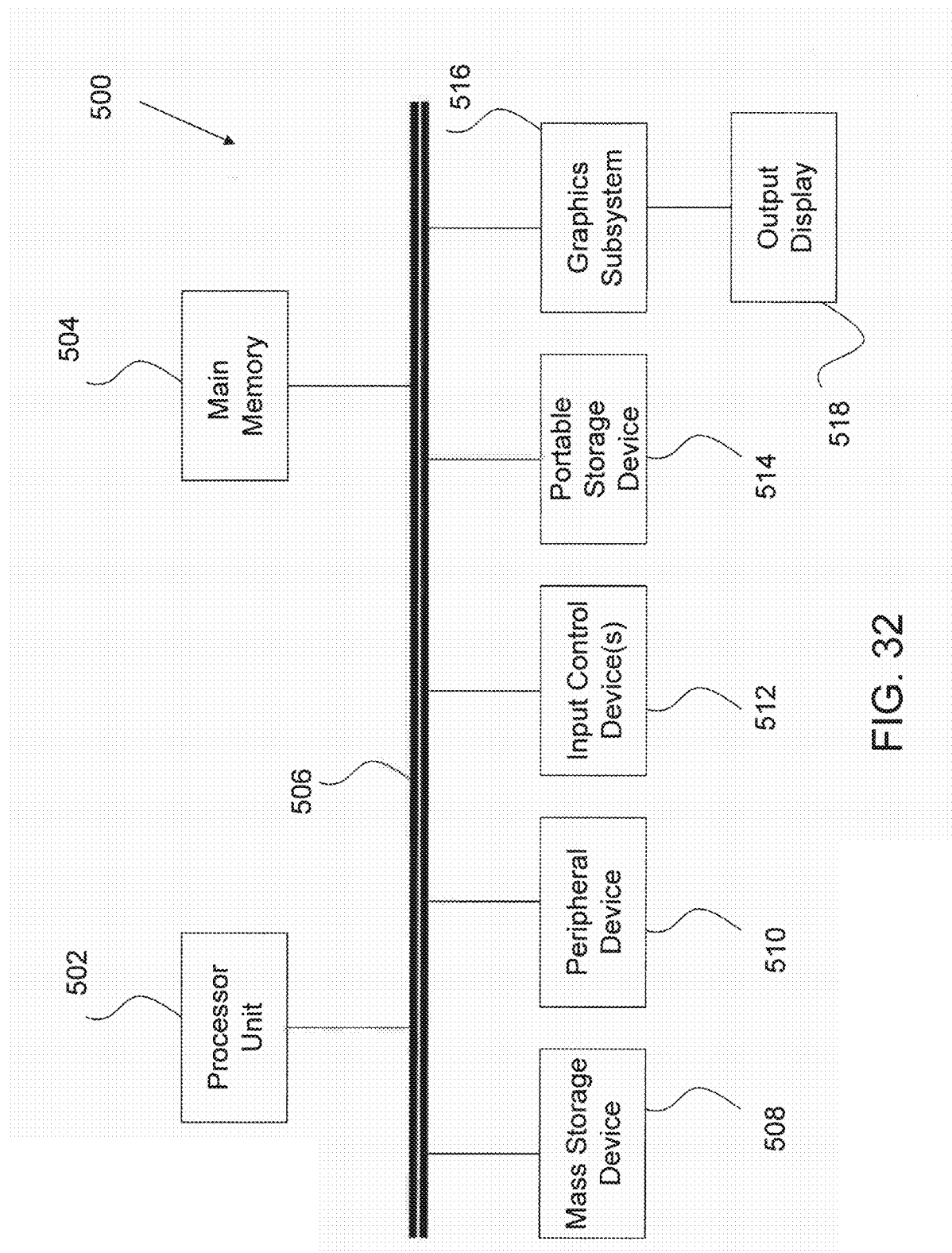

FIG. 32 illustrates a block diagram of a computer system which may be employed to implement various embodiments in accordance with the present invention. A computer system 500 contains a processor unit 502, a main memory 504, an interconnect bus 506, a mass storage device 508, peripheral device(s) 510, input control device(s) 512, portable storage drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor 502. Main memory 504 preferably includes banks of dynamic random access memory (DRAM) as well as high-speed cache memory.

For the purpose of simplicity, the components of computer system 500 are connected via interconnect bus 506. However, computer system 500 may be connected through one or more data transport means. For example, processor unit 502 and main memory 504 may be connected via a local microprocessor bus and mass storage device 508, peripheral device(s) 510, portable storage medium drive(s) 514, and graphic subsystem 516 may be connected via one or more input/output (I/O) buses. Mass storage device 508, which may be implemented with a magnetic disk drive, an optical disk drive, a solid state device, or an attachment to network storage, is non-volatile storage device for storing data, databases, and instructions, to be used by processor unit 502. In a software embodiment, mass storage device 508 may store the software to load it into main memory 504. Mass storage device 508 may include any form of non-transitory computer readable media and may include multiple forms of different media.

Portable storage medium drive 514 operates in conjunction with a portable non-volatile storage medium such as a floppy disk, a compact disk read only memory (CD-ROM), a digital versatile disk read only memory (DVD-ROM), or a memory card such as e.g. Secure Digital High Capacity (SDHC), to input and output data and code to and from the computer system 500. In one embodiment, the software is stored on such a portable medium, and is input to computer system 500 via portable storage medium drive 514. Peripheral device(s) 510 may include any type of computer supported device such as an input/output (I/O) interface, to add additional functionality to computer system 500. For example, peripheral device (s) 510 may include a network interface card to interface computer system 500 to a network.

Input control device(s) 512 provide a portion of the user interface for a computer system 500 user. Input control device (s) 512 may include an alphanumeric keypad for inputting alphanumeric and other key information; and a cursor control device such as a mouse, a track pad or stylus; or cursor direction keys.

In order to display textual and graphical information, computer system 500 contains graphic subsystem 514 and output display(s) 518. Output display 518 may include a cathode ray tube (CRT) display, liquid crystal display (LCD), plasma, digital light processing (DLP) or active matrix organic light emitting diode (AMOLED) display. Graphic subsystem 516 receives textual and graphical information and processes the information for output to display 518.

In a software implementation, a method formed in accordance with an exemplary embodiment of the present invention includes a plurality of computer executable instructions, to be implemented on a computer system. Prior to loading in the computer system, the software may reside as encoded information on a computer-readable tangible or non-transitory medium such as a magnetic floppy disk, a magnetic tape, CD-ROM, DVD-ROM, flash memory, or any other suitable computer readable medium.

In a hardware implementation, such a system in accordance with an exemplary embodiment of the present invention may be realized in any suitable computer based platform known in the art. For example, the system may comprise suitable storage media and one or more dedicated processors or shared processors executing/controlling other functions, wherein the employed processor(s) is programmably configured with processor instructions for performing the functions described herein. Suitable circuits may also be developed to execute certain aspects of these functions.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A method for generating a programmably implemented model for emulating signal processing operation of an integrated circuit (IC) core in an electronic system using a computer, the method comprising:

establishing a power integrity (PI) topology including behavioral models to emulate a power delivery network (PDN) serving the IC core, said PI topology maintaining at least one supply reference voltage in variable manner responsive to parametric coupling of the PDN with the IC core and an IO interface buffer of the electronic system during operation thereof;

establishing a signal integrity (SI) topology including behavioral models to emulate analog input, output, and transmission characteristics of the IC core; and, interconnecting said SI topology to said PI topology to form a composite SI/PI topology, said SI topology being thereby;

executing, by using a computer, alternating current (AC) and transient simulation for the composite SI/PI topology to generate SI integrity analysis data.

2. The method as recited in claim 1, wherein said SI topology is established to include a plurality of buffer models and at least one transmission line model representing signal trace interconnections therebetween.

3. The method as recited in claim 2, wherein said PI topology is established to include a power plane model extracted by a solver for a conductive power rail portion of the PDN, said transmission line model for the signal trace interconnections of said SI topology being included with a layout of said conductive power rail portion of the PDN in extracting said power plane model.

4. The method as recited in claim 3, wherein said PI topology is established to further include:
 a first behavioral model interconnected to said power rail model indicative of the current consumption characteristics of the IC core; and,
 a second behavioral model interconnected to said power rail model indicative of the current consumption of an IO interface buffer driving an output signal of the electronic system.

5. The method as recited in claim 2, wherein said buffer models are each defined according to the IBIS standard.

6. The method as recited in claim 5, wherein said IBIS buffer models are each adaptively reconfigured according to said variable supply reference voltages of said PI topology.

7. The method as recited in claim 2, wherein said PI topology is established to provide variable VCC and GND supply reference levels to power each of said buffer models.

8. A method for unified signal integrity (SI) and power integrity (PI) analysis using a computer for an integrated circuit (IC) core powered operating in an electronic system by a power delivery network (PDN), the method comprising:

establishing a PI topology including models to emulate the PDN serving the IC core, said PI topology maintaining at least one supply reference voltage in variable manner responsive to parametric coupling of the PDN with the IC core and an IO interface buffer of the electronic system during operation thereof, said PI topology including:
 a power plane model for a conductive power rail portion of the PDN;
 a first behavioral model interconnected to said power rail model indicative of the current consumption characteristics of the IC core; and,
 a second behavioral model interconnected to said power rail model indicative of the current consumption of an IO interface buffer driving an output signal of the electronic system;

establishing an SI topology including a plurality of behavioral buffer models and at least one transmission line model representing signal trace interconnections therebetween to emulate analog input, output, and transmission characteristics of the IC core;

interconnecting said SI topology to said PI topology to form a composite SI/PI topology, said SI topology being thereby powered responsive to said variable supply reference voltage of said PI topology; and, executing, by using a computer, alternating current (AC) and transient simulation for the composite SI/PI topology to generate SI integrity analysis data.

9. The method as recited in claim 8, wherein said power plane model of said PI topology is extracted by a solver for said conductive power rail portion of the PDN, said transmission line model for the signal trace interconnections of said SI topology being included with a layout of said conductive power rail portion of the PDN in extracting said power plane model.

10. The method as recited in claim 9, wherein said behavioral buffer models of said SI topology are each defined according to the IBIS standard.

11. The method as recited in claim 10, wherein said IBIS buffer models of said SI topology are each adaptively reconfigured according to said variable supply reference voltages of said PI topology.

12. The method as recited in claim 11, wherein said PI topology is established to provide variable VCC and GND supply reference levels to power each of said IBIS buffer models.

13. A system for unified signal integrity (SI) and power integrity (PI) analysis of an integrated circuit (IC) core powered operate in an electronic system by a power delivery network (PDN), the system comprising:
 a controller unit generating a programmably implemented composite model for emulating signal processing operation of the IC core, the composite model including:
  a PI topology having behavioral models interconnected to emulate the PDN serving the IC core, said PI topology maintaining at least one supply reference voltage in variable manner responsive to parametric coupling of the PDN with the IC core and an IO interface buffer of the electronic system during operation thereof; and,
  an SI topology interconnected to said PI topology, said SI topology having behavioral models interconnected to emulate analog input, output, and transmission characteristics of the IC core, said SI topology being thereby powered responsive to said variable supply reference voltage of said PI topology; and,
 a simulator unit coupled to said controller unit, said simulator unit executing alternating current (AC) and transient simulation for the composite model to generate SI integrity analysis data for IC core operation.

14. The system as recited in claim 13, wherein said SI topology includes a plurality of buffer models and at least one transmission line model representing signal trace interconnections therebetween.

15. The system as recited in claim 14, wherein said PI topology includes a power plane model extracted by a solver for a conductive power rail portion of the PDN, said transmission line model for the signal trace interconnections of said SI topology being included with a layout of said conductive power rail portion of the PDN in extracting said power plane model.

16. The system as recited in claim 15, wherein said PI topology further includes:
 a first behavioral model interconnected to said power rail model indicative of the current consumption characteristics of the IC core; and,
 a second behavioral model interconnected to said power rail model indicative of the current consumption of an IO interface buffer driving an output signal of the electronic system.

17. The system as recited in claim 14, wherein said buffer models are each defined according to the IBIS standard.

18. The system as recited in claim 17, wherein said IBIS buffer models are each adaptively reconfigured according to said variable supply reference voltages of said PI topology.

19. The system as recited in claim 13, wherein said PI topology provides variable VCC and GND supply reference levels to power each of said buffer models.

20. A computer program product for generating a programmably implemented model to emulate signal processing operation of an integrated circuit (IC) core in an electronic system, the computer program product comprising a non-transitory computer usable medium having program instructions for:
   establishing a power integrity (PI) topology including behavioral models to emulate a power delivery network (PDN) serving the IC core, said PI topology maintaining at least one supply reference voltage in variable manner responsive to parametric coupling of the PDN with the IC core and an IO interface buffer of the electronic system during operation thereof;
   establishing a signal integrity (SI) topology including behavioral models to emulate analog input, output, and transmission characteristics of the IC core; and,
   interconnecting said SI topology to said PI topology to form a composite SI/PI topology, said SI topology being thereby;
   executing, by using a computer, alternating current (AC) and transient simulation for the composite SI/PI topology to generate SI integrity analysis data.

21. The computer program product as recited in claim 20, wherein:
   said SI topology is established to include a plurality of buffer models and at least one transmission line model representing signal trace interconnections therebetween; and,
   said PI topology is established to include a power plane model extracted by a solver for a conductive power rail portion of the PDN, said transmission line model for the signal trace interconnections of said SI topology being included with a layout of said conductive power rail portion of the PDN in extracting said power plane model.

22. The computer program product as recited in claim 21, wherein said PI topology is established to further include:
   a first behavioral model interconnected to said power rail model indicative of the current consumption characteristics of the IC core; and,
   a second behavioral model interconnected to said power rail model indicative of the current consumption of an IO interface buffer driving an output signal of the electronic system.

23. The computer program product as recited in claim 21, wherein said buffer models are each defined according to the IBIS standard, each of said IBIS buffer models being adaptively reconfigured according to said variable supply reference voltages of said PI topology.

24. The computer program product as recited in claim 21, wherein said PI topology is established to provide variable VCC and GND supply reference levels to power each of said buffer models.

* * * * *